United States Patent
Shi et al.

(10) Patent No.: US 10,777,214 B1
(45) Date of Patent: Sep. 15, 2020

(54) METHOD FOR EFFICIENT AUTONOMOUS LOUDSPEAKER ROOM ADAPTATION

(71) Applicant: Amazon Technologies, Inc., Seattle, WA (US)

(72) Inventors: Guangji Shi, San Jose, CA (US); Trausti Thor Kristjansson, San Jose, CA (US); Jan Aage Abildgaard Pedersen, Sunnyvale, CA (US); Philip Ryan Hilmes, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/456,247

(22) Filed: Jun. 28, 2019

(51) Int. Cl.
*H04B 3/20* (2006.01)
*G10L 21/02* (2013.01)
*H04R 1/40* (2006.01)
*G10K 11/16* (2006.01)
*H04R 3/00* (2006.01)

(52) U.S. Cl.
CPC .............. *G10L 21/02* (2013.01); *G10K 11/16* (2013.01); *H04R 1/406* (2013.01)

(58) Field of Classification Search
CPC .......... G10L 21/02; G10K 11/16; H04R 1/406
USPC ...................................................... 381/66, 92
See application file for complete search history.

(56) References Cited

U.S. PATENT DOCUMENTS 9,294,860 B1 * 3/2016 Carlson ................ H04R 29/008

* cited by examiner

*Primary Examiner* — Ammar T Hamid
(74) *Attorney, Agent, or Firm* — Pierce Atwood LLP

(57) ABSTRACT

A system that performs wall detection, range estimation, and/or corner detection to determine a position of a device relative to acoustically reflective surfaces. The device generates output audio using loudspeaker(s), generates microphone audio data using a microphone array, and generates impulse response data for each of the microphones. The device may generate the impulse response data using an acoustic echo cancellation (AEC) component or multi-channel AEC (MC-AEC). The device may detect a peak in the impulse response data and determine a distance to a reflective surface based on the peak. Based on a number of reflected surfaces detected by the device, the device may classify a position of the device within the room, such as whether the device is in a corner, along one wall, or in an open area. By knowing the position relative to the room surfaces, the device may improve sound equalization and other processing.

20 Claims, 23 Drawing Sheets

FIG. 2
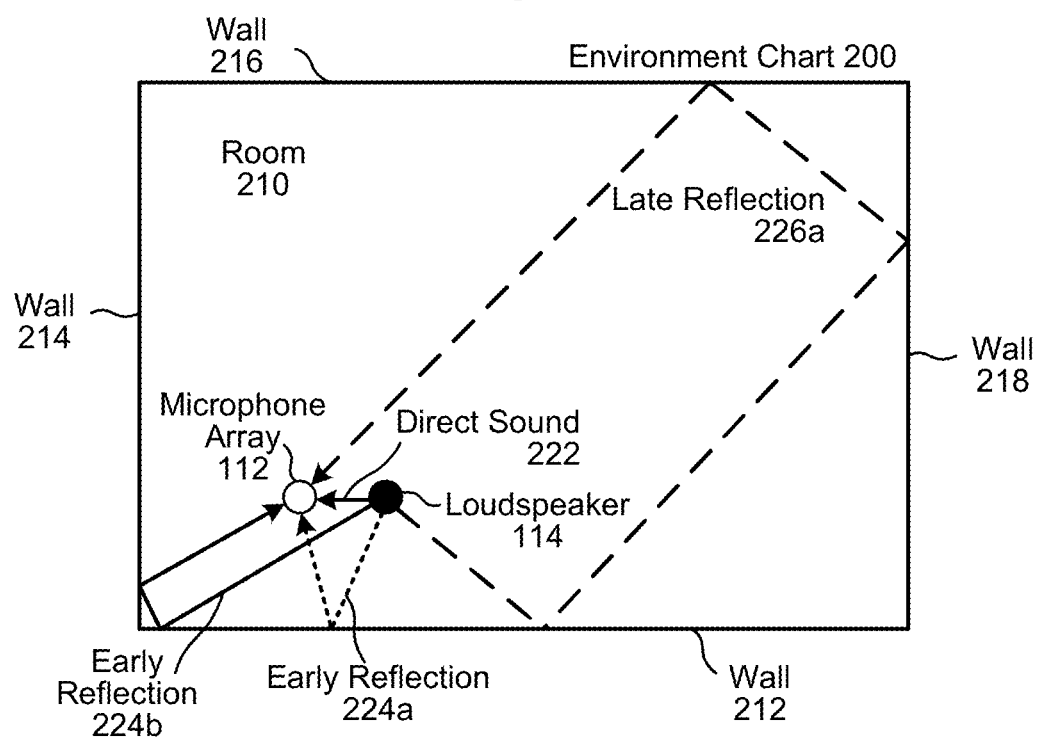
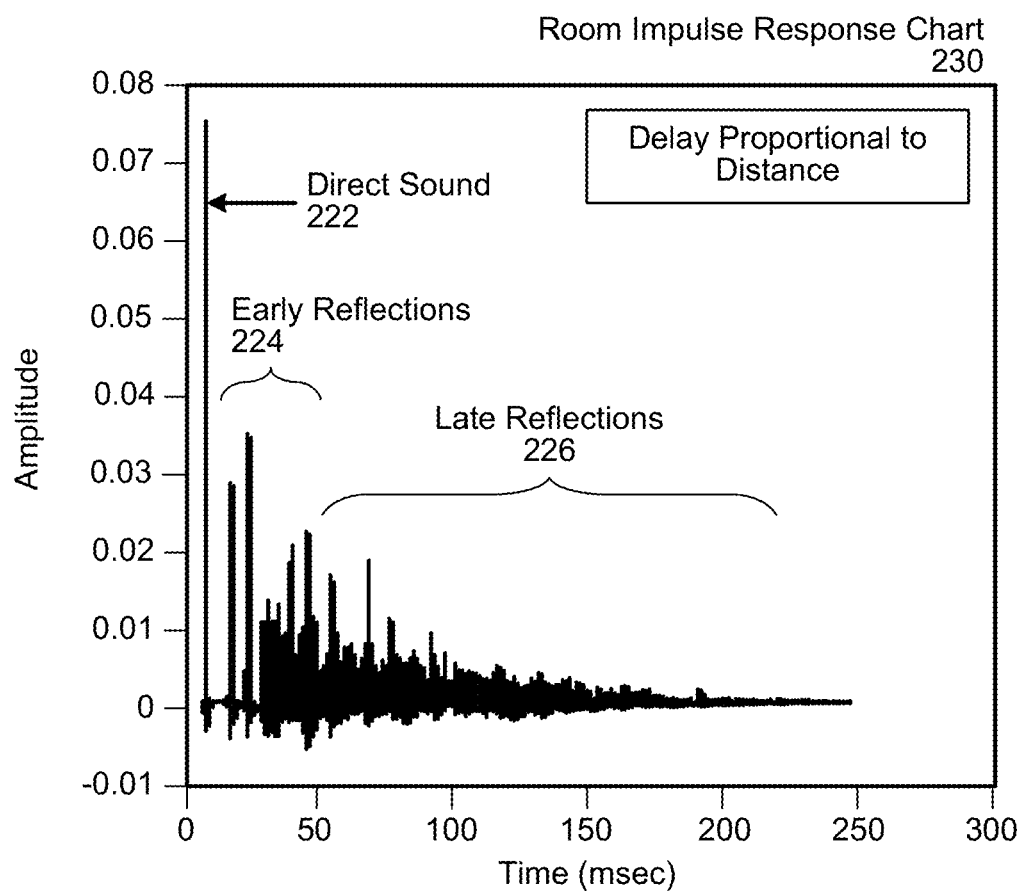

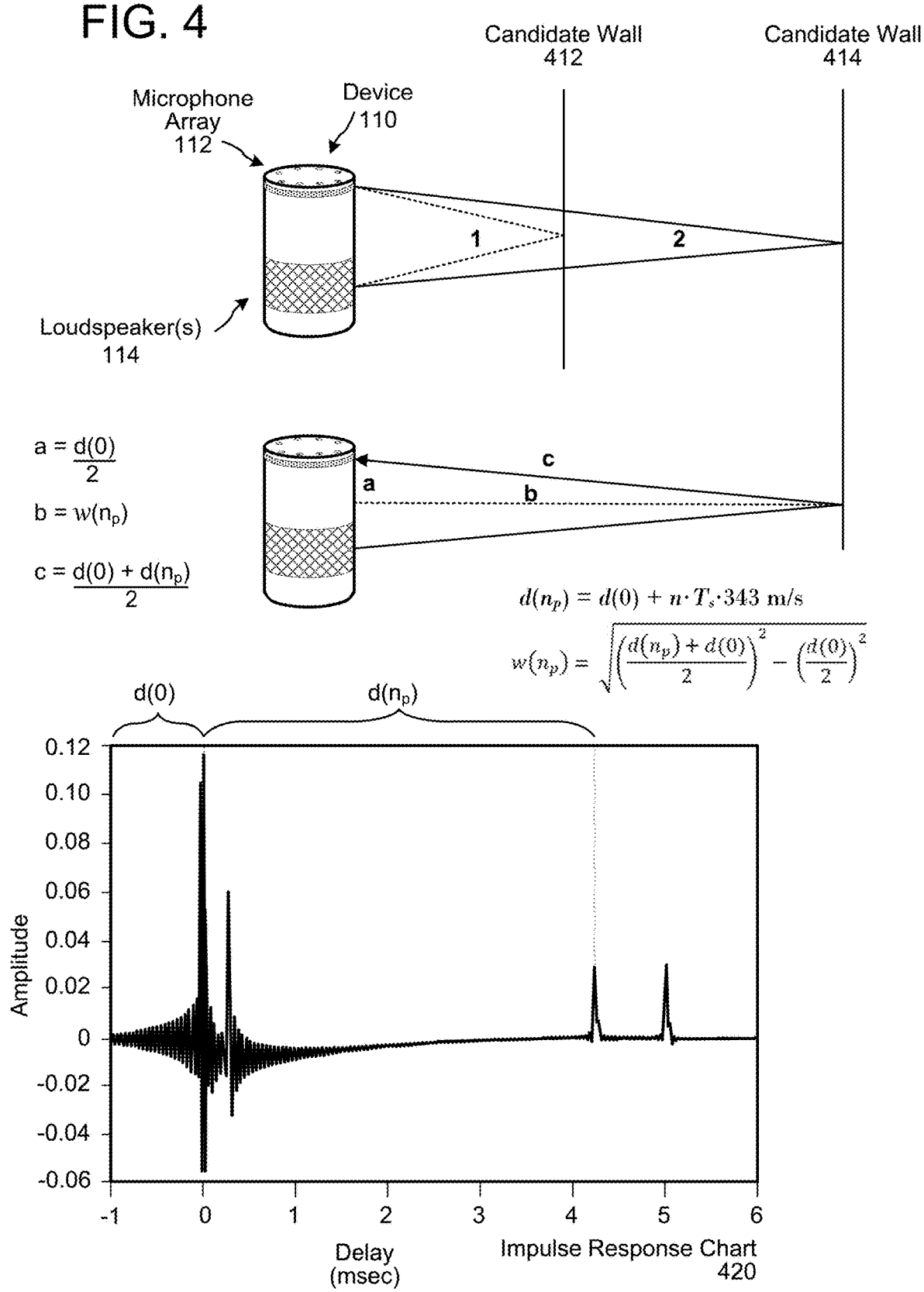

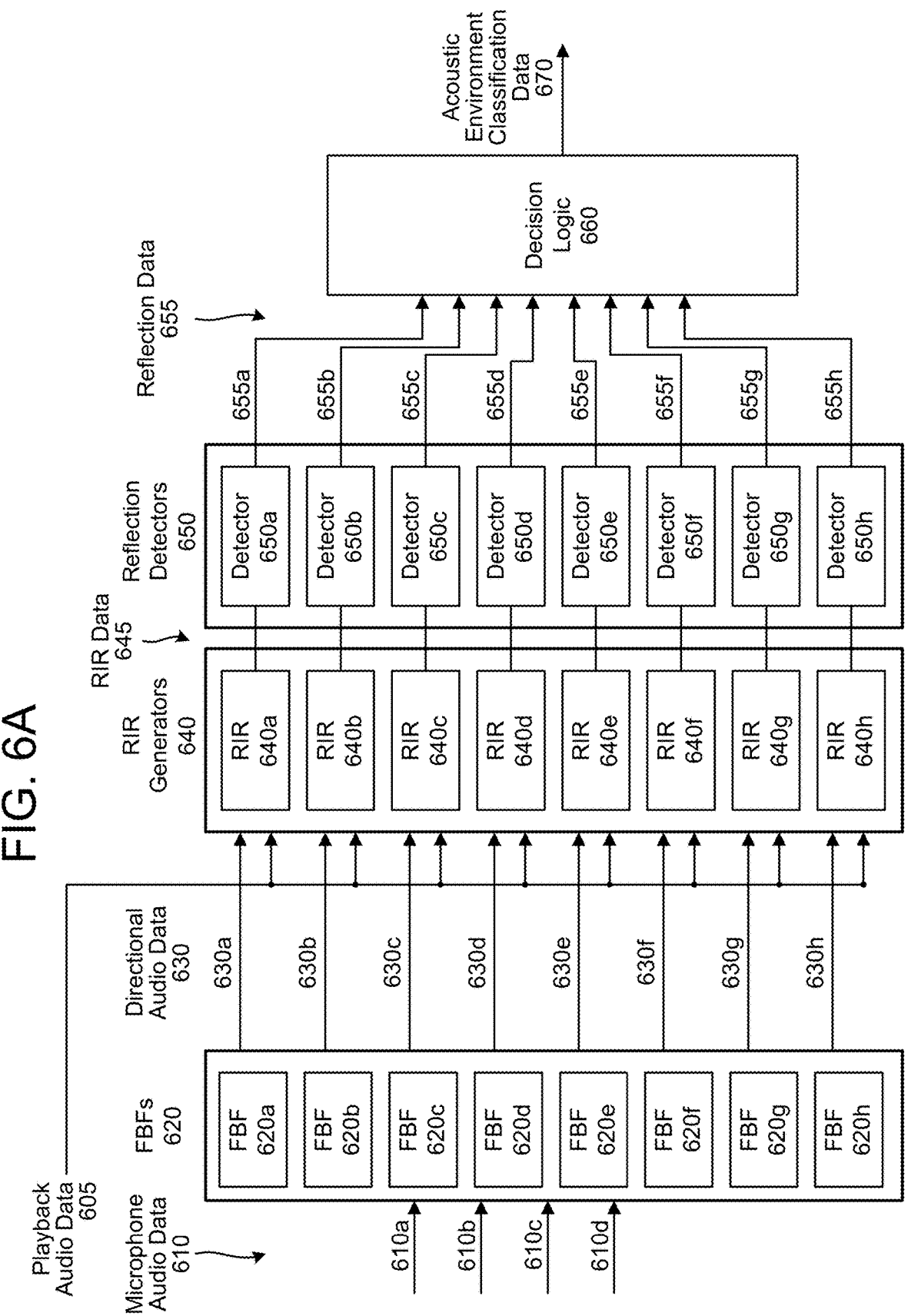

FIG. 6B
Free Classification
690
655a = No
655b = No
655c = No
655d = No
655e = No
655f = No
655g = No
655h = No
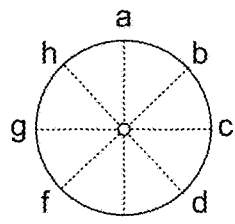
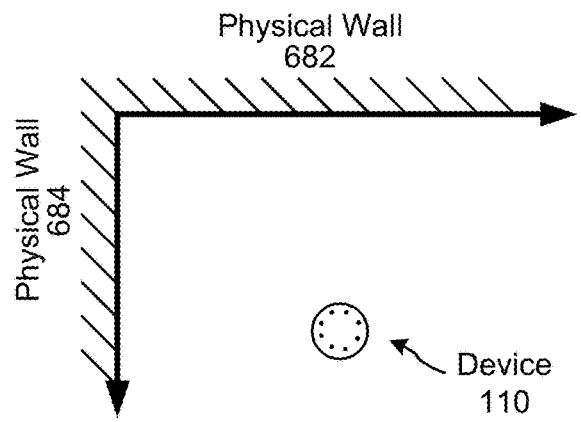
Wall Classification
692
655a = Yes
655b = No
655c = No
655d = No
655e = No
655f = No
655g = No
655h = No
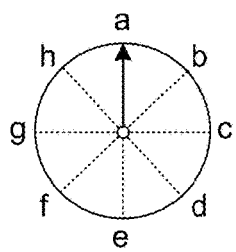
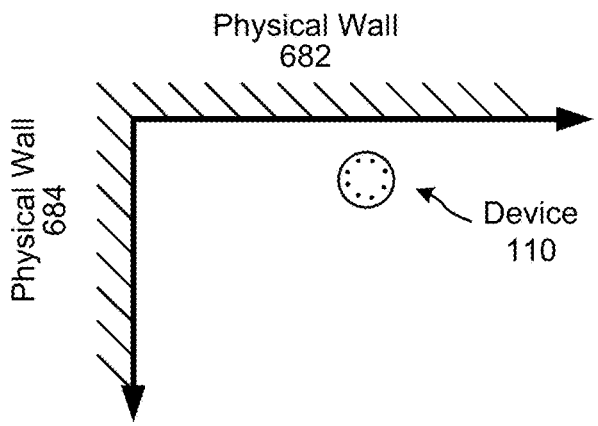
Corner Classification
694
655a = Yes
655b = No
655c = No
655d = No
655e = No
655f = No
655g = Yes
655h = No
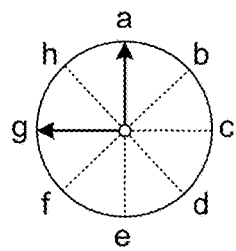
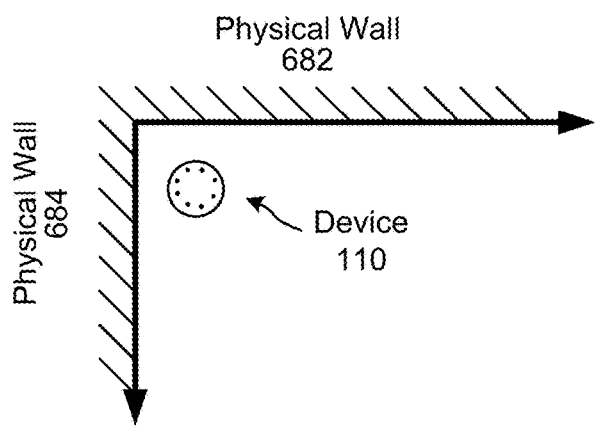

FIG. 6C
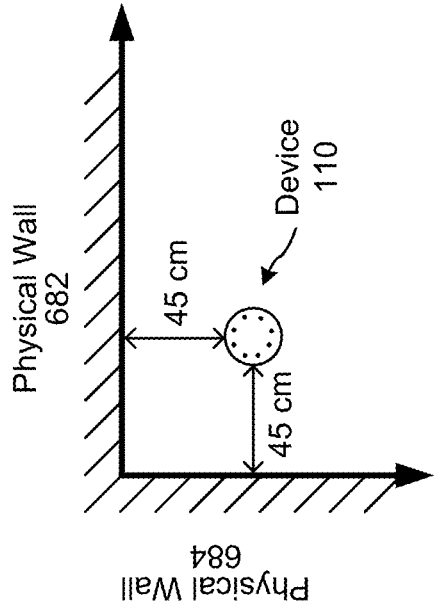
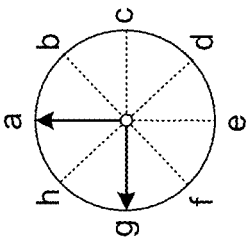
Corner Classification
696
655a = Yes; 45 cm
655b = No
655c = No
655d = No
655e = No
655f = No
655g = Yes; 45 cm
655h = No
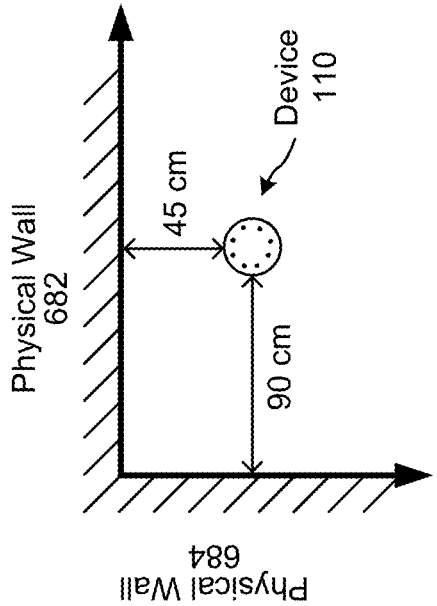
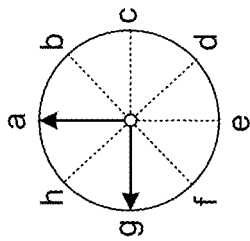
Corner Classification
698
655a = Yes; 45 cm
655b = No
655c = No
655d = No
655e = No
655f = No
655g = Yes; 90 cm
655h = No

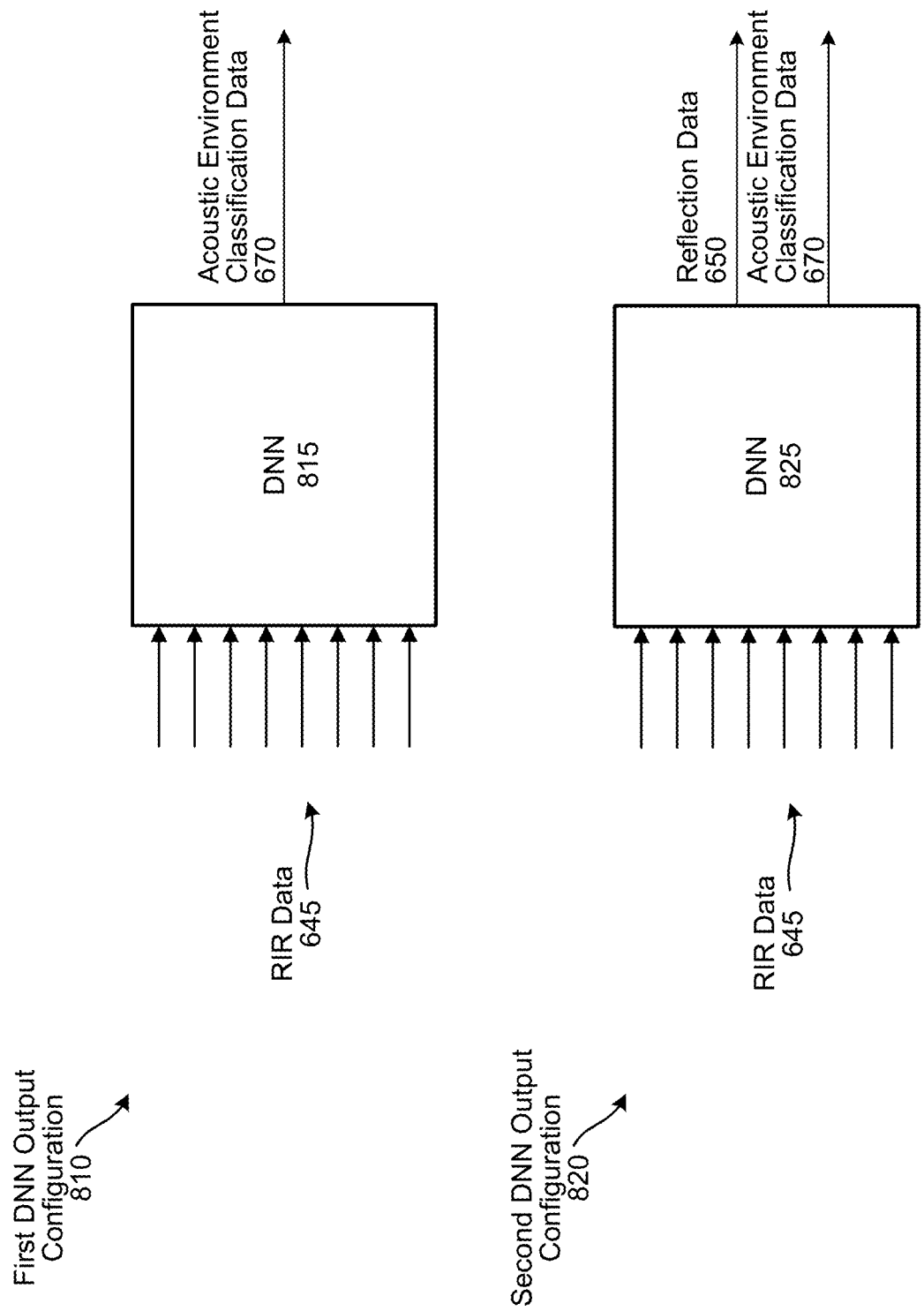

METHOD FOR EFFICIENT AUTONOMOUS LOUDSPEAKER ROOM ADAPTATION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 2 illustrates examples of sound propagation in a room resulting in direct sound, early reflections and late reflections.

FIG. 4 illustrates an example of determining distances associated with candidate walls according to embodiments of the present disclosure.

FIGS. 6A-6C illustrate examples of determining acoustic environment classifications according to embodiments of the present disclosure.

FIGS. 8A-8B illustrate examples of determining acoustic environment classifications using deep neural network(s) according to embodiments of the present disclosure.

DETAILED DESCRIPTION

Electronic devices may be used to capture audio data and generate audio. For example, an electronic device may generate audio using loudspeakers and may capture audio data using one or more microphones. If the electronic device is located in the vicinity of hard surfaces (e.g., walls, ceiling, shelves, etc.), the presence of acoustically reflective surfaces negatively impacts performance of the electronic device. For example, the presence of acoustically reflective surfaces changes a transfer function of the broader acoustic system and can have a negative effect on both speech recognition performance and sound quality.

To improve sound quality, devices, systems and methods are disclosed that determine position(s) of acoustically reflective surface(s) relative to the device and modify audio settings based on the position(s). The device generates output audio using at least one loudspeaker, generates microphone audio data using one or more microphones in a microphone array, and then generates impulse response data for each of the microphones. The device may generate the impulse response data using an acoustic echo cancellation (AEC) component or a multi-channel AEC component. Using a trained model (e.g., machine learning model, such as a deep neural network (DNN) component), the device may estimate a position of the device relative to reflected surfaces (e.g., walls) in a room. For example, the device 110 may detect a peak in the impulse response data and determine a distance and/or direction to a reflective surface based on the peak. Based on a number of reflected surfaces and/or direction(s) of the reflected surfaces detected by the device, the device may estimate the position of the device in the room, such as whether the device is in a corner, along one wall, or in an open area. By knowing the position relative to the room surfaces, the device may improve sound equalization and other processing.

Figure 1:
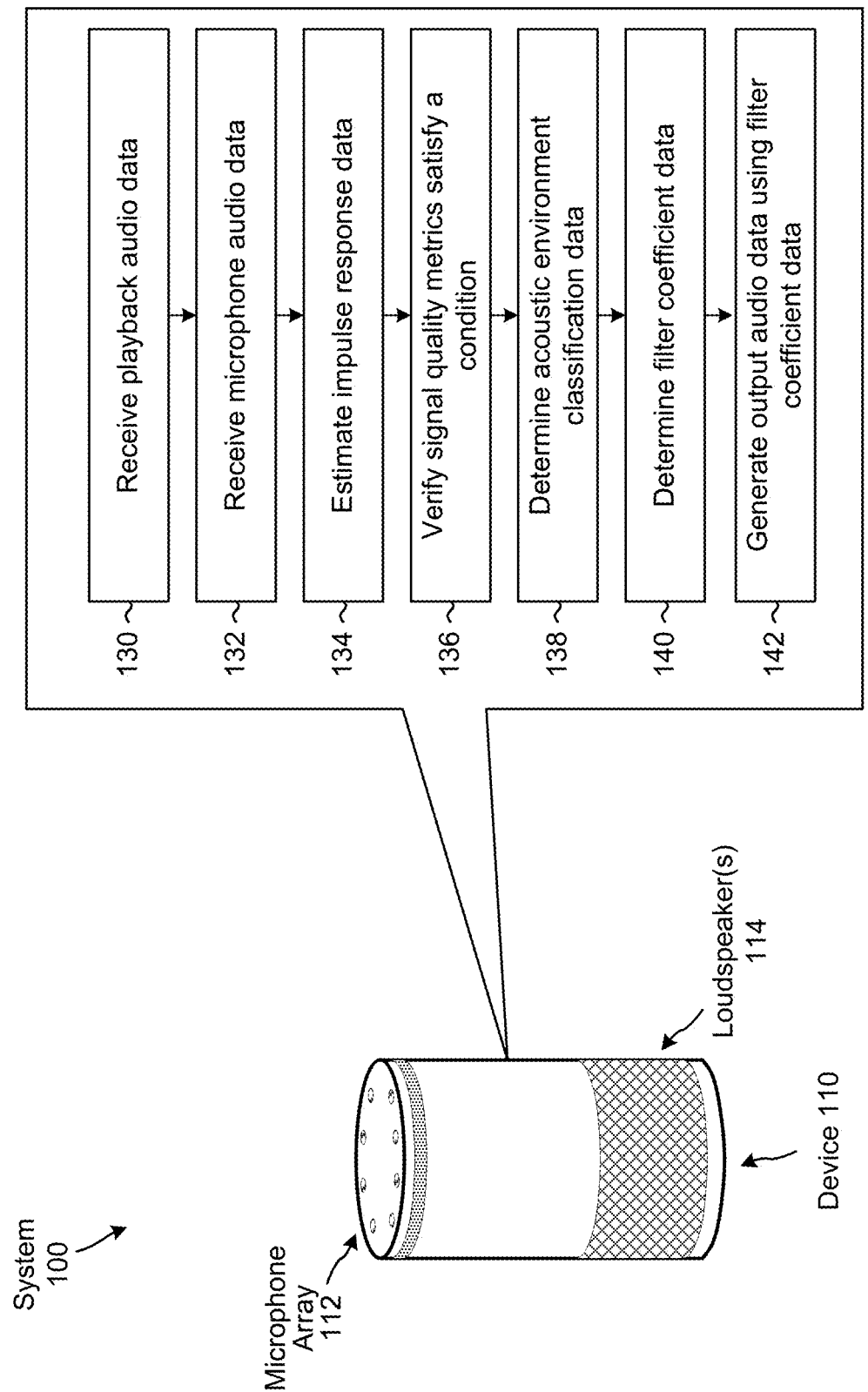
FIG. 1 illustrates a system for determining an acoustic environment classification of a device according to embodiments of the present disclosure.

FIG. 1 illustrates a system for determining an acoustic environment classification of a device according to embodiments of the present disclosure. As illustrated in FIG. 1, a system 100 may include a device 110 that has a microphone array 112 and one or more loudspeaker(s) 114. To detect user speech or other audio, the device 110 may use one or more microphones in the microphone array 112 to generate microphone audio data that captures audio in a room (e.g., an environment) in which the device 110 is located. As is known and as used herein, "capturing" an audio signal includes a microphone transducing audio waves (e.g., sound waves) of captured sound to an electrical signal and a codec digitizing the signal to generate the microphone audio data.

The device 110 may also send playback audio data to the loudspeaker(s) 114 and the loudspeaker(s) 114 may generate audible sound(s) based on the playback audio data. When the loudspeaker(s) 114 generate the audible sound(s), the microphone array 112 may capture portions of the audible sound(s) (e.g., an echo), such that the microphone audio data may include a representation of the audible sound(s) generated by the loudspeaker(s) 114 (e.g., corresponding to portions of the playback audio data) in addition to any additional sounds (e.g., local speech from a user) picked up by the microphone array 112. Thus, the microphone audio data may be referred to as input audio data and may include a representation of the audible sound(s) output by the loudspeaker(s) 114 and/or a representation of the speech input. While FIG. 1 illustrates the microphone array 112 including eight microphones, the disclosure is not limited thereto and the microphone array 112 may include any number of microphones without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., reference audio data or playback audio data, microphone audio data or input audio data, etc.) or audio signals (e.g., playback signals, microphone signals, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

The portion of the audible sound(s) output by the loudspeaker(s) 114 that reaches the microphone array 112 (e.g., echo portion) can be characterized based on a transfer function. For example, a first portion of the playback audio data output by the loudspeaker(s) 114 and captured by a first microphone in the microphone array 112 can be characterized (e.g., modeled) using a first transfer function $h_{a1}(n)$ and a second portion of the playback audio data output by the loudspeaker(s) 114 and captured by a second microphone in the microphone array 112 can be characterized using a second transfer function $h_{a2}(n)$. Thus, a number of transfer functions may vary depending on the number of loudspeaker(s) 114 and/or microphones in the microphone array 112 without departing from the disclosure. The transfer functions h(n) vary with the relative positions of the components and the acoustics of the room (e.g., environment surrounding the device 110). If the position of all of the objects in the room are static, the transfer functions h(n) are likewise static. Conversely, if the position of an object in the room changes, the transfer functions h(n) may change.

The microphone audio data contains some of the reproduced sounds from the playback audio data (e.g., "echo" signal), in addition to any additional sounds picked up in the room (e.g., local speech from a user). The echo signal portion of the microphone audio data can be expressed as:

$$y_1(n)=h_1(n)*x_1(n)+h_2(n)*x_2(n)+h_P(n)*x_P(n) \quad [1]$$

where $y_1(n)$ is estimated echo audio data corresponding to an estimate of the echo received by a first microphone in the microphone array 112, $[h_1(n), h_2(n), \ldots h_P(n)]$ correspond to loudspeaker-to-microphone impulse responses in the room (e.g., aggregate impulse response, which includes the system impulse response and the room impulse response), $[x_1(n), x_2(n), \ldots x_P(n)]$ correspond to playback audio data (e.g., loudspeaker reference signals) for P loudspeakers, * denotes a mathematical convolution, and "n" is an audio sample.

Determining an estimate of a room impulse response may be beneficial for a variety of different applications, including improving the sound quality of output audio generated by the device 110, improving echo cancellation for speech recognition, and/or the like. For example, the room impulse response may be used to improve sound equalization prior to generating the output audio, taking into account acoustic characteristics of the room to improve the sound quality of the output audio. To illustrate an example, if the device 110 is positioned in a corner of the room the output audio may be perceived as having too much bass, whereas if the device 110 is positioned on an island in the middle of the room the output audio may be perceived as having too little bass. Thus, by determining the estimate of the room impulse response, the device 110 may perform dynamic sound equalization to generate consistent output audio regardless of a position of the device 110 relative to acoustically reflective surfaces.

Additionally or alternatively, the estimated room transfer function may enable and/or improve echo cancellation by enabling the device 110 to generate estimated echo audio data using estimated transfer function(s) and playback audio data. Before determining the estimated echo audio data, the device 110 may modify the playback audio data to compensate for distortion, variable delay, drift, skew and/or frequency offset. In some examples, the device 110 may include playback reference logic that may receive first playback audio data (e.g., originally transmitted audio output by the loudspeaker(s) 114) and compensate for distortion, variable delay, drift, skew and/or frequency offset to generate second playback audio data. For example, the playback reference logic may determine a propagation delay between the first playback audio data and the microphone audio data and may modify the second playback audio data to remove the propagation delay. Additionally or alternatively, the playback reference logic may determine a frequency offset between the first playback audio data and the microphone audio data and may add/drop samples of the second playback audio data and/or the microphone audio data to compensate for the frequency offset. For example, the playback reference logic may add at least one sample per cycle when the frequency offset is positive and may remove at least one sample per cycle when the frequency offset is negative. Therefore, the second playback audio data may be aligned with the microphone audio data.

If the device 110 includes a single loudspeaker 114, an acoustic echo canceller (AEC) component may perform acoustic echo cancellation for one or more microphones in the microphone array 112. For ease of explanation, the disclosure may refer to removing estimated echo audio data from microphone audio data to perform acoustic echo cancellation. The system 100 removes the estimated echo audio data by subtracting the estimated echo audio data from the microphone audio data, thus cancelling the estimated echo audio data. This cancellation may be referred to as "removing," "subtracting" or "cancelling" interchangeably without departing from the disclosure.

To illustrate an example, the AEC component may calculate an estimated transfer function $\hat{h}(n)$ that models an acoustic echo (e.g., impulse response) between the loudspeaker 114 and an individual microphone in the microphone array 112. Thus, the AEC component (or multiple AEC components) may include a first echo estimation filter block that uses a first estimated transfer function $\hat{h}_1(n)$ that models a first transfer function $h_{a1}(n)$ between the loudspeaker 114 and a first microphone 112a of the microphone array, a second echo estimation filter block that uses a second estimated transfer function $\hat{h}_2(n)$ that models a second transfer function $h_{a2}(n)$ between the loudspeaker 114 and a second microphone 112b, and so on.

The echo estimation filter blocks use the estimated transfer functions (e.g., $\hat{h}_1(n)$ and $\hat{h}_2(n)$) to produce estimated echo audio data (e.g., first estimated echo audio data for the first microphone 112a, second estimated echo audio data for a second microphone 112b, etc.). For example, the AEC component may convolve the second playback audio data (e.g., playback audio data after compensating for distortion, variable delay, drift, skew and/or frequency offset) with the estimated transfer functions $\hat{h}(n)$ (e.g., estimated impulse responses of the room) to generate the estimated echo audio data. Thus, the AEC component may convolve the second playback audio data by the first estimated transfer function $\hat{h}_1(n)$ to generate first estimated echo data, which models a portion of first microphone audio data (e.g., output of the first microphone 112a), may convolve the second playback audio data by the second estimated transfer function $\hat{h}_2(n)$ to generate the second estimated echo audio data, which models a portion of second microphone audio data (e.g., output of the second microphone 112b), and so on. The AEC component may determine the estimated echo audio data using adaptive filters. For example, the adaptive filters may be normalized least means squared (NLMS) finite impulse response (FIR) adaptive filters that adaptively filter the playback audio data using filter coefficients.

If the device 110 includes multiple loudspeakers 114, a multi-channel acoustic echo canceller (MC-AEC) component may perform acoustic echo cancellation similarly to the technique described above. Thus, the MC-AEC component may calculate estimated transfer functions $\hat{h}(n)$, each of which models an acoustic echo (e.g., impulse response) between an individual loudspeaker 114 and an individual microphone in the microphone array 112. For example, a first echo estimation filter block may use a first estimated transfer function $\hat{h}_i(n)$ that models a first transfer function $h_{a1}(n)$ between a first loudspeaker 114a and a first microphone 112a, a second echo estimation filter block may use a second estimated transfer function $\hat{h}_2(n)$ that models a second transfer function $h_{a2}(n)$ between a second loudspeaker 114b and the first microphone 112a, and so on. In addition, the device 110 may determine a set of transfer functions $\hat{h}(n)$ for each microphone in the microphone array 112 without departing from the disclosure. For ease of explanation, the loudspeaker(s) 114 will be referred to as a single loudspeaker, which simplifies a corresponding description. However, the disclosure is not limited thereto and the device 110 may include two or more loudspeakers 114 without departing from the disclosure.

When the microphone audio data only corresponds to the echo (e.g., audible sounds produced by the loudspeaker(s) 114), audio data (e.g., e) output by the AEC component should eventually converge to zero (assuming that the sounds captured by the microphone array 112 correspond to sound entirely based on the playback audio data rather than additional ambient noises, such that the estimated echo audio data cancels out an entirety of the microphone audio data). However, $e \rightarrow 0$ does not always imply that $h - \hat{h} \rightarrow 0$, where the estimated transfer function $\hat{h}$ cancelling the corresponding actual transfer function h is the goal of the adaptive filter. For example, the estimated transfer functions $\hat{h}(n)$ may cancel a particular string of samples, but is unable to cancel all signals, e.g., if the string of samples has no energy at one or more frequencies. As a result, effective cancellation may be intermittent or transitory. Having the estimated transfer function $\hat{h}$ approximate the actual transfer function h is the goal of single-channel echo cancellation, and becomes even more critical in the case of multichannel echo cancellers that require estimation of multiple transfer functions. Thus, correctly estimating a room impulse response improves a performance of acoustic echo cancellation.

While the examples described above refer to details about performing echo cancellation using the playback audio data, the disclosure is not limited thereto and the device 110 may perform echo cancellation using the microphone audio data, such as adaptive noise cancellation (ANC), adaptive interference cancellation (AIC), and/or the like, without departing from the disclosure. Thus, the device 110 may estimate the room transfer function regardless of whether the device 110 includes an AEC component and/or generates a reference signal using the playback audio data.

In some examples, such as when performing echo cancellation using ANC/AIC processing, the device 110 may include a beamformer that may perform audio beamforming on the microphone audio data to determine target audio data (e.g., audio data on which to perform echo cancellation). The beamformer may include a fixed beamformer (FBF) and/or an adaptive noise canceller (ANC), enabling the beamformer to isolate audio data associated with a particular direction. The FBF may be configured to form a beam in a specific direction so that a target signal is passed and all other signals are attenuated, enabling the beamformer to select a particular direction (e.g., directional portion of the microphone audio data). In contrast, a blocking matrix may be configured to form a null in a specific direction so that the target signal is attenuated and all other signals are passed (e.g., generating non-directional audio data associated with the particular direction). The beamformer may generate fixed beamforms (e.g., outputs of the FBF) or may generate adaptive beamforms (e.g., outputs of the FBF after removing the non-directional audio data output by the blocking matrix) using a Linearly Constrained Minimum Variance (LCMV) beamformer, a Minimum Variance Distortionless Response (MVDR) beamformer or other beamforming techniques. For example, the beamformer may receive audio input, determine six beamforming directions and output six fixed beamform outputs and six adaptive beamform outputs. In some examples, the beamformer may generate six fixed beamform outputs, six LCMV beamform outputs and six MVDR beamform outputs, although the disclosure is not limited thereto. Using the beamformer and techniques discussed below, the device 110 may determine target signals on which to perform acoustic echo cancellation using the AEC component. However, the disclosure is not limited thereto and the device 110 may perform AEC without beamforming the microphone audio data without departing from the present disclosure. Additionally or alternatively, the device 110 may perform beamforming using other techniques known to one of skill in the art and the disclosure is not limited to the techniques described above.

As discussed above, the device 110 may include a microphone array 112 having multiple microphones that are laterally spaced from each other so that they can be used by audio beamforming components to produce directional audio signals. The microphones may, in some instances, be dispersed around a perimeter of the device 110 in order to apply beampatterns to audio signals based on sound captured by the microphone(s). For example, the microphones may be positioned at spaced intervals along a perimeter of the device 110, although the present disclosure is not limited thereto. In some examples, the microphone(s) may be spaced on a substantially vertical surface of the device 110 and/or a top surface of the device 110. Each of the microphones is omnidirectional, and beamforming technology may be used to produce directional audio signals based on audio data generated by the microphones. In other embodiments, the microphones may have directional audio reception, which may remove the need for subsequent beamforming.

In various embodiments, the microphone array 112 may include greater or less than the number of microphones illustrated in FIG. 1. In some examples, loudspeaker(s) 114 may be located at the bottom of the device 110, and may be configured to emit sound omnidirectionally, in a 360 degree pattern around the device 110. For example, the loudspeaker(s) 114 may comprise a round loudspeaker element directed downwardly in the lower part of the device 110, although the disclosure is not limited thereto.

Using the plurality of microphones included in the microphone array 112, the device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones in a microphone array.

The device 110 may include a beamformer that may include one or more audio beamformers or beamforming components that are configured to generate an audio signal that is focused in a particular direction (e.g., direction from which user speech has been detected). More specifically, the beamforming components may be responsive to spatially separated microphone elements of the microphone array to produce directional audio signals that emphasize sounds originating from different directions relative to the device 110, and to select and output one of the audio signals that is most likely to contain user speech.

Audio beamforming, also referred to as audio array processing, uses a microphone array 112 having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speaker recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

The device 110 may perform beamforming to determine a plurality of portions or sections of audio received from a microphone array (e.g., directional portions, which may be referred to as directional audio data). To illustrate an example, the device 110 may use a first beamforming configuration that includes six portions or sections (e.g., Sections 1-6). For example, the device 110 may include six different microphones, may divide an area around the device 110 into six sections or the like. However, the present disclosure is not limited thereto and the number of microphones in the microphone array 112 and/or the number of portions/sections in the beamforming may vary. For example, the device 110 may use a second beamforming configuration including eight portions/sections (e.g., Sections 1-8) without departing from the disclosure. For example, the device 110 may include eight different microphones, may divide the area around the device 110 into eight portions/sections or the like.

The number of portions/sections generated using beamforming does not depend on the number of microphones in the microphone array. For example, the device 110 may include twelve microphones in the microphone array but may determine three portions, six portions or twelve portions of the audio data without departing from the disclosure. As discussed above, the beamformer may generate fixed beamforms (e.g., outputs of the FBF) or may generate adaptive beamforms using a Linearly Constrained Minimum Variance (LCMV) beamformer, a Minimum Variance Distortionless Response (MVDR) beamformer or other beamforming techniques. For example, the beamformer may receive the audio input, may determine six beamforming directions and output six fixed beamform outputs and six adaptive beamform outputs corresponding to the six beamforming directions. In some examples, the beamformer may generate six fixed beamform outputs, six LCMV beamform outputs and six MVDR beamform outputs, although the disclosure is not limited thereto.

The transfer functions h(n) characterize the acoustic "impulse response" of the room (e.g., room impulse response (RIR)) relative to the individual components. The impulse response, or impulse response function, of the room characterizes the signal from a microphone when presented with a brief input signal (e.g., an audible noise), called an impulse. The impulse response describes the reaction of the system as a function of time. If the impulse responses associated with the microphone array 112 and/or the loudspeaker(s) 114 are known, and the content of the playback audio data output by the loudspeaker(s) 114 is known, then the transfer functions h(n) can be used to estimate the actual loudspeaker-reproduced sounds that will be received by an individual microphone in the microphone array 112. Additionally or alternatively, the room impulse response enables the device 110 to generate transfer functions that can be used to estimate the actual loudspeaker-reproduced sounds that will be received by a user in the room listening to the output audio. Thus, the device 110 may improve the perceived sound quality associated with the output audio.

The room impulse response (RIR) corresponds to acoustic characteristics of the room and may vary based on a size of the room, a number of acoustically reflective surfaces (e.g., walls, ceilings, large objects, etc.), a location of the device 110 within the room, or the like. For example, the loudspeaker(s) 114 may generate audible sounds at a first time and, at a second time soon after the first time, the microphone array 112 may detect strong original sound waves (e.g., incident sound waves) generated by the loudspeaker(s) 114, which may be referred to as "direct sound." If the device 110 is located in a center of a relatively large room (e.g., relatively large distance between the device 110 and a nearest acoustically reflective surface), there may be a lengthy time delay before a third time that the microphone array 112 detects reflected sound waves that are reflected by the acoustically reflective surfaces, which may be referred to as "reflections." As a magnitude of a sound wave is proportional to a distance traveled by the sound wave, the reflected sound waves may be relatively weak in comparison to the incident sound waves. In contrast, if the room is relatively small and/or the device 110 is located near an acoustically reflective surface, there may be a relatively short time delay before the microphone array 112 detects the reflected sound waves at the third time and the reflected sound waves may be stronger in comparison to the incident sound waves. If a first acoustically reflective surface is in proximity to the device 110 and a second acoustically reflective surface is distant from the device 110, the device 110 may detect "early reflections" reflected by the first acoustically reflective surface prior to detecting "late reflections" reflected by the second acoustically reflective surface.

For ease of explanation, the following descriptions may refer to the device 110 being located in a "room" and determining a "room impulse response" associated with the room. However, the disclosure is not limited thereto and the device 110 may be located in an "environment" or "location" (e.g., concert hall, theater, outdoor theater, outdoor area, etc.) without departing from the disclosure. Thus, the device 110 may determine an impulse response associated with the environment/location (e.g., environment impulse response, location impulse response, etc.), even if the environment/location does not correspond to a room per se, without departing from the disclosure.

For ease of explanation, the following descriptions may refer to a "wall" or "candidate wall" in order to provide a clear illustration of one or more techniques for estimating a distance and/or direction associated with an acoustically reflective surface. However, this is intended to provide a simplified example and the disclosure is not limited thereto. Instead, techniques used by the device 110 to estimate a distance and/or direction associated with a candidate wall may be applied to other acoustically reflective surfaces without departing from the present disclosure. Thus, while the following description may refer to techniques for determining a distance and/or direction associated with a candidate wall, one of skill in the art may apply the disclosed techniques to estimate a distance and/or direction associated with any acoustically reflective surface (e.g., ceiling, floor, object, etc.).

FIG. 2 illustrates examples of sound propagation in a room resulting in direct sound, early reflections and late reflections. As illustrated by environment chart 200 in FIG. 2, a room 210 (e.g., environment) may be comprised of a first wall 212, a second wall 214, a third wall 216 and a fourth wall 218. The device 110 may be located in proximity to a bottom-left corner of the environment chart 200 (e.g., near an intersection between the first wall 212 and the second wall 214).

If a loudspeaker 114 of the device 110 generates output audio at a first time, the microphone array 112 may detect direct sound 212, which corresponds to incident sound waves propagating directly from the loudspeaker 114 to the microphone array 112, at a second time soon after the first time. At a third time after the second time, the microphone array 112 may detect early reflections 224, which correspond to reflected sound waves that are reflected by nearby walls, such as a first early reflection 224a reflected by the first wall 212 and a second early reflection 224b reflected by both the first wall 212 and the second wall 214. At a fourth time after the third time, the microphone array 112 may detect late reflections 226, which correspond to reflected sound waves that are reflected by distant walls, such as a first late reflection 226a that is reflected by the first wall 212, the fourth wall 218, and the third wall 216 before being detected by the microphone array 112.

For ease of illustration, the environment chart 200 only illustrates a single reflection associated with each wall, but the present disclosure is not limited thereto and each wall may correspond to one or more reflections without departing from the disclosure.

The room 210 illustrated in the environment chart 200 may correspond to a room impulse response illustrated in room impulse response chart 230. The room impulse response chart 230 represents an amplitude (e.g., y-axis) of the room impulse response over time (e.g., x-axis). As illustrated in the room impulse response chart 230, the direct sound 222 corresponds to a first peak of the room impulse response, which occurs at a first time (e.g., $T_1<10$ ms) and has a relatively large amplitude (e.g., magnitude of the first peak is relatively high). The early reflections 224 correspond to a first series of peaks that occur after a short delay during a second time range (e.g., 10 ms$<T_2<50$ ms) and have smaller amplitudes than the first peak. For example, the first early reflection 224a may correspond to a second peak of the microphone audio data (e.g., 18 ms) and the second early reflection 224b may correspond to a third peak of the microphone audio data (e.g., 23 ms). Finally, the late reflections 226 correspond to a second series of peaks that occur after a lengthy delay during a third time range (e.g., 50 ms$<T_3<250$ ms) and have smaller amplitudes than the first series of peaks. For example, the first late reflection 226a may correspond to a fourth peak of the microphone audio data (e.g., 70 ms).

A time delay of a reflection (e.g., x-value associated with a corresponding peak) is proportional to a distance traveled by the reflected sound waves. Thus, the early reflections 224 correspond to candidate walls in proximity to the device 110 and the late reflections 226 correspond to candidate walls that are distant from the device 110. Based on the time delay associated with an individual peak in the room impulse response, the device 110 may determine a distance from the device 110 to a candidate wall corresponding to the individual peak, as will be described in greater detail below with regard to FIG. 4.

A room impulse response (RIR) of a room (e.g., location or environment) corresponds to acoustic characteristics of the room. To determine a value of an acoustic characteristic of an environment (e.g., RIR of the environment), the device 110 may emit sounds at known frequencies (e.g., chirps, text-to-speech audio, music or spoken word content playback, etc.) and measure a reverberant signature of the environment. The device 110 may then use the reverberant signature of the environment to estimate the room impulse response. Measured over time in an ongoing fashion, the device 110 may be able to generate a consistent picture of the RIR and the reverberant qualities of the environment, thus better enabling the device 110 to determine or approximate where it is located in relation to walls or corners of the environment (assuming the device 110 is stationary). Further, if the device 110 is moved, the device 110 may be able to determine this change by noticing a change in the RIR pattern and may determine distances/directions to walls using the RIR. Thus, the room impulse response enables the device 110 to perform wall detection, range estimation, and/or angular estimation. Based on this information, the device 110 may determine a location of the device 110 within the room, a physical layout of the room, whether the device 110 is in a corner (e.g., where two or more walls or acoustically reflective surfaces meet) of the room (e.g., corner detection), or the like.

While the device 110 cannot directly measure a room impulse response, the device 110 may estimate the room impulse response based on an "aggregate" impulse response, which is a combination of the room impulse response (e.g., acoustic characteristics of a room or location) and a system impulse response (e.g., impulse response associated with the device 110, which is based on impulse responses specific to the loudspeaker(s) 114 and the microphone array 112). For example, a noisy estimate of the aggregate impulse response is given by:

$$h(n) = s(n) * r(n) + w(n) \quad [2]$$

where h(n) is the aggregate impulse response, s(n) is the system impulse response corresponding to impulse responses associated with the loudspeaker(s) 114 and the microphone array 112, r(n) is the room impulse response, which includes direct sound as well as all reflections, w(n) is a noise term, which can be assumed to be normally distributed and independent of all other terms, * denotes a mathematical convolution, and "n" is an audio sample.

The device 110 may determine the aggregate impulse response based on playback audio data that is output by the loudspeaker(s) 114 and microphone audio data generated by the microphone array 112. For example, microphone audio data y(n) corresponding to playback audio data x(n) is given by:

$$y(n) = x(n) * s(n) * r(n) + v(n) \quad [3]$$

where y(n) is the microphone audio data generated by the microphone array 112, x(n) is the playback audio data sent to the loudspeaker(s) 114, s(n) is the system impulse response, r(n) is the room impulse response, v(n) is a noise term, which can be assumed to be normally distributed and independent of all other terms, * denotes a mathematical convolution, and "n" is an audio sample.

Based on the playback audio data x(n) and the microphone audio data y(n), the device 110 may determine the aggregate impulse response h(n). As the device 110 has a fixed configuration between the loudspeaker(s) 114 and the microphone array 112, the device 110 knows the system response s(n). By removing the system impulse response s(n) from the aggregate impulse response h(n) (e.g., which may be done by performing deconvolution and/or other techniques known in the art), the device 110 can estimate the room impulse response r(n). For ease of explanation, the disclosure will refer to the aggregate impulse response and the room impulse response interchangeably, with the understanding that one of skill in the art may convert between the two. Thus, the disclosure may refer to estimating the room impulse response based on the playback audio data and the microphone audio data without specifically mentioning the aggregate impulse response.

While the room impulse response chart 230 illustrates a room impulse response that has clear peaks corresponding to the direct sound 222 and the early reflections 224, this is intended for illustrative purposes only and in some examples the room impulse response may include more noise. For example, while the direct sound 222 may clearly rise above a noise floor of the room impulse response, the early reflections 224 may be obscured by the noise floor and may not be as easily detectable.

Figure 3A:
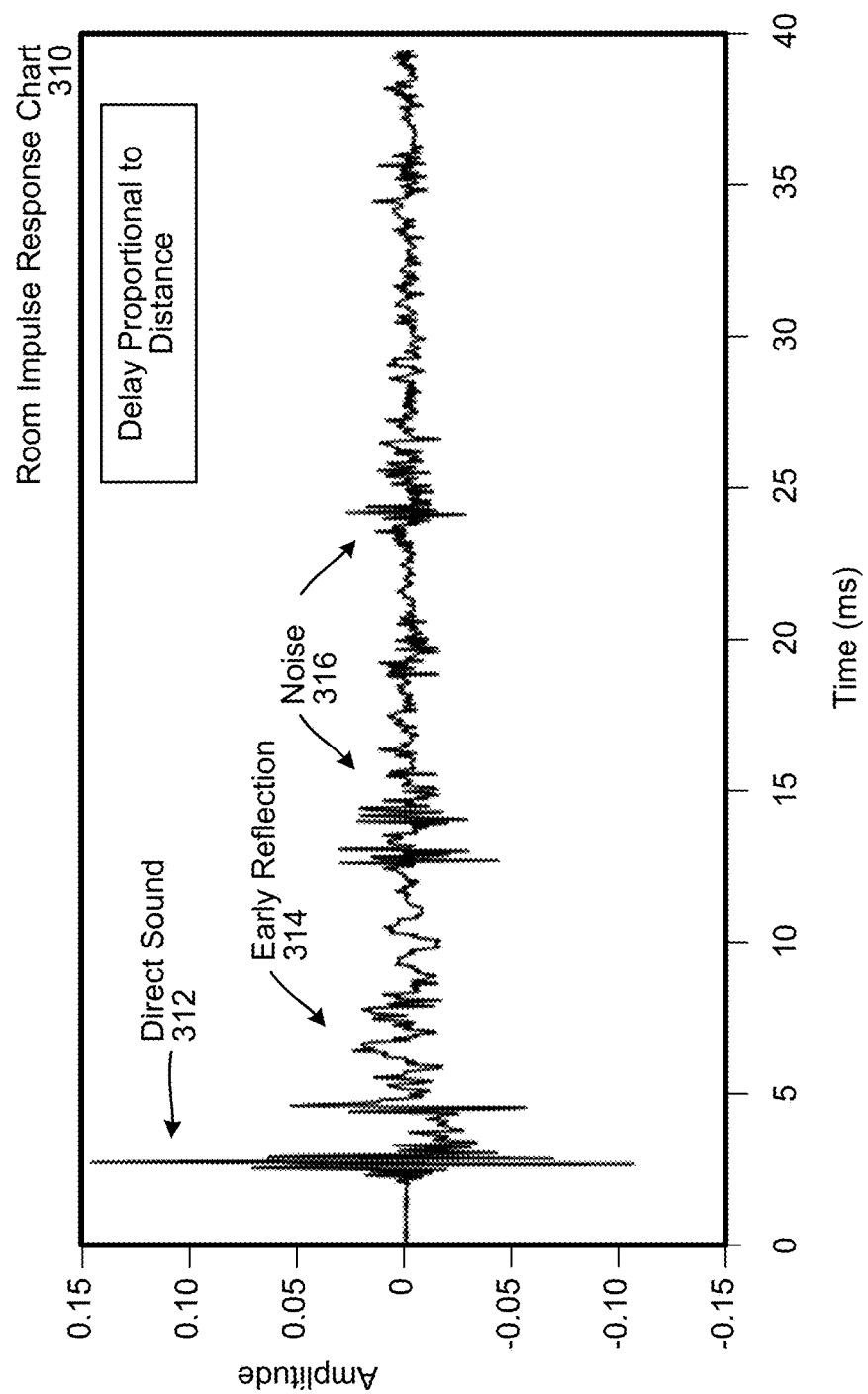
FIGS. 3A-3B illustrate an example of a room impulse response representing direct sound and early reflections and an example of acoustic power varying based on distance from a corner.
Figure 3B:
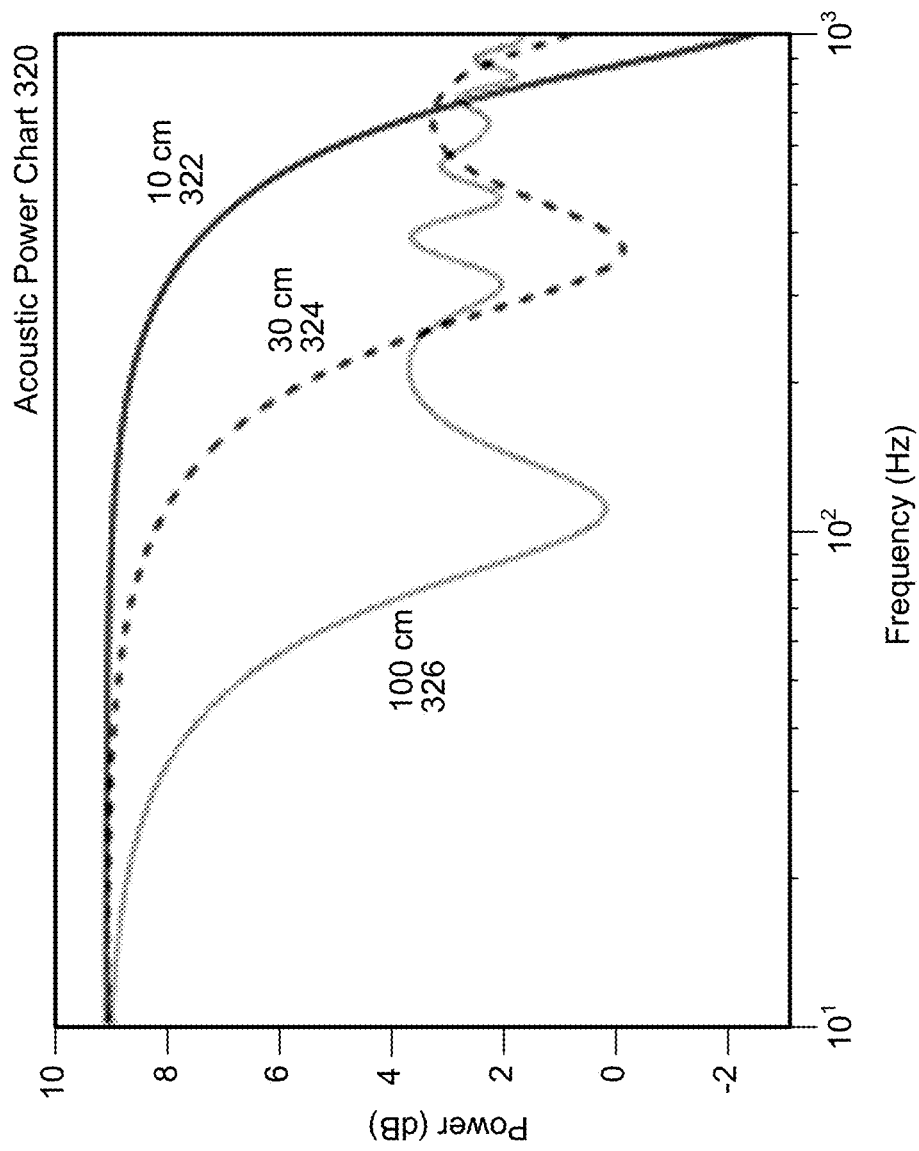

FIGS. 3A-3B illustrate examples of a room impulse response representing direct sound and early reflections and an example of acoustic power varying based on distance from a corner. As illustrated in FIG. 3A, room impulse response chart 310 may represent a room impulse response that includes direct sound 312, an early reflection 314, and noise 316. As described above, the room impulse response chart 310 represents an amplitude (e.g., y-axis) of the room impulse response over time (e.g., x-axis), with the x-axis indicating a delay associated with the reflections. As illustrated in the room impulse response chart 310, the direct sound 312 corresponds to a first peak of the room impulse response, which occurs at a first time (e.g., $T_1$<2.5 ms) and has a relatively large amplitude (e.g., magnitude of the first peak is relatively high). The early reflection 314 corresponds to a second peak that occurs after a short delay at a second time (e.g., $T_2$=7 ms) and has a smaller amplitude than the first peak. However, the early reflection 314 is located within noise 316 of the room impulse response, which has other peaks similar to the second amplitude of the early reflection 314. Thus, it may be difficult for the device 110 to determine which peak corresponds to an actual reflection as opposed to noise in the room impulse response. As will be described in greater detail below with regard to FIGS. 8A-8B, the device 110 may include a deep neural network (DNN) component that is configured to detect reflections and/or determine which peak(s) correspond to reflection(s).

A time delay of a reflection (e.g., x-value associated with a corresponding peak) is proportional to a distance traveled by the reflected sound waves. For example, the early reflection 314 may correspond to a candidate wall in proximity to the device 110. Based on the time delay associated with an individual peak in the room impulse response, the device 110 may determine a distance from the device 110 to a candidate wall corresponding to the individual peak, as will be described in greater detail below with regard to FIG. 4.

FIG. 3B illustrates an example of acoustic power varying based on distance from a corner. As illustrated in FIG. 3B, an acoustic power chart 320 may represent acoustic power relative to free field positions when the device 110 is placed at different positions near a corner. For example, the acoustic power chart 320 represents a first signal 322 corresponding to a first position (e.g., 10 cm between the device 110 and two side walls), a second signal 324 corresponding to a second position (e.g., 30 cm between the device 110 and the two side walls), and a third signal 326 corresponding to a third position (e.g., 100 cm between the device 110 and the two side walls). As illustrated in FIG. 3B, the acoustic power drops off at lower frequencies the further the device 110 is positioned relative to the corner.

FIG. 4 illustrates an example of determining distances associated with candidate walls according to embodiments of the present disclosure. As described in greater detail above, the device 110 may determine room impulse response data based on playback audio data and microphone audio data. For example, the device 110 may determine the impulse response data based on differences between the playback audio data and the microphone audio data as well as Equations [2]-[3] described above.

Room impulse responses can be broken into two distinct regions with a smooth transition. For example, a first region corresponds to early reflections, which tend to be sparse and impulse-like, whereas a second region corresponds to late reflections. After a sufficient amount of time has passed (depending on room geometry), the room impulse response consists of a superposition of many reflections, so that the late tail of the response (e.g., late reflections) is well modeled as a Gaussian.

When acoustically reflective surfaces are at a distance from the device 110, the device 110 may operate normally as audio received from a specific direction corresponds to audio generated in the direction. However, when acoustically reflective surfaces are in close proximity to the device 110, the acoustically reflective surfaces reflect sound waves such that the device 110 may detect audio arriving from a first direction (e.g., direct audio) and a second direction (e.g., reflections of the audio). Thus, the device 110 may improve performance by detecting acoustically reflective surfaces that are in close proximity to the device 110. To detect an acoustically reflective surface, the device 110 may assume that the early reflections correspond to primary reflections (e.g., sound waves reflected off of a single wall) and may use trigonometry to determine a distance to the acoustically reflective surface. Thus, each peak (e.g., non-zero component) in the room impulse response data corresponds to a unique acoustically reflective surface. While the device 110 may detect secondary reflections from a nearby wall before detecting a primary reflection from a distant wall, the device 110 does not need an accurate distance/direction associated with the distant wall as it is less likely to cause unwanted reflections that negatively impact processing of the device 110.

When generating the room impulse response data, the device 110 aligns the system impulse response (s) and the aggregate impulse response (h) such that their largest peaks overlap. This ensures that the direct sound delay is zero and that the corresponding peak appears in the room impulse response data at t=0. Therefore, the room impulse response data is time-shifted relative to the aggregate impulse response data, with the aggregate impulse response data indicating a time relative to the loudspeaker(s) 114 outputting the audible sound(s) and the room impulse response data indicating a time delay relative to the direct sound being received by the microphone array 112. Thus, each peak in the room impulse response data corresponds to a time delay (in ms) relative to the direct sound. For example, a first peak may be associated with a first time (e.g., 12 ms) in the aggregate impulse response data, which indicates that the first peak was received 12 ms after the loudspeaker(s) 114 outputted the audible sound(s), and is associated with a second time (e.g., 9 ms) in the room impulse response data, which indicates that the first peak was received 9 ms after the direct sound was received by the microphone(s) 112.

The device 110 may determine a first time delay associated with the direct sound based on the aggregate impulse response data, as the first time delay corresponds to an amount that the room impulse response data is time-shifted relative to the aggregate impulse response data. For example, an initial peak in the room impulse response data (e.g., direct sound at t=0 ms) corresponds to an initial peak in the aggregate impulse response data that is associated with a first time (e.g., t=3 ms), and the device 110 may determine the first time delay based on the first time. For example, if the loudspeaker(s) 114 generated the audible sound(s) at t=0, the first time delay is equal to the first time. Alternatively, if the loudspeaker(s) 114 generated the audible sound(s) at a second time, the device 110 may determine the first time delay by subtracting the second time from the first time.

Knowing the first time delay, the device 110 may determine a first distance associated with the first peak (e.g., direct sound), which corresponds to a loudspeaker-microphone distance d(0) (e.g., distance between the loudspeaker(s) 114 and the first microphone). The device 110 may determine the first distance (e.g., d(0)) by multiplying the first time delay by the speed of sound (e.g., 343 m/s). Additionally or alternatively, the device 110 may already know the loudspeaker-microphone distance d(0) based on a configuration of the device 110 (e.g., the device 110 is programmed with the fixed distance between the loudspeaker(s) 114 and the microphone array 112).

Knowing the speaker-microphone distance d(0), the device 110 may determine a distance travelled by each reflection in the room impulse response data, the distance given by:

$$d(n) = d(0) + n \cdot T_s \cdot 343 \frac{\text{m}}{\text{s}}, \forall n > 0 \quad [4]$$

where d(n) is the distance travelled by the reflected sound waves, d(0) is the speaker-microphone distance, n is the reflection (e.g., lag index) associated with the reflected sound waves, $T_s$ is a time delay (in seconds) associated with the reflection (e.g., time associated with a peak in the room impulse response data), and $$343 \frac{\text{m}}{\text{s}}$$

is the speed of sound. The lag-specific (e.g., reflection-specific) regularization parameter is then obtained as:

$$\lambda_1(n) = \frac{\lambda}{d(n)} \quad [5]$$

where $\lambda_1(n)$ is the lag-specific regularization parameter (e.g., parameter value unique to an individual reflection or lag index), $\lambda$ is a common scaling factor used for all lag indexes, d(n) is the lag-specific distance (e.g., distance traveled by the reflected sound waves), and n is the reflection (e.g., lag index) associated with the reflected sound waves.

FIG. 4 illustrates an example of determining distances associated with candidate walls according to embodiments of the present disclosure. As illustrated in FIG. 4, a device 110 may detect first reflected sound waves (1) associated with the first candidate wall 412 and may detect second reflected sound waves (2) associated with the second candidate wall 414. As illustrated in FIG. 4, the device 110 may generate audible sound(s) using the loudspeaker(s) 114 that are located near a bottom of the device 110. Incident sound waves associated with the audible sound(s) may propagate through the air in a first direction (e.g., toward the first candidate wall 412) until they reach the first candidate wall 412, at which point the first reflected sound waves (1) may be reflected by the first candidate wall 412 and propagate through the air until being detected by the microphone array 112 at the top of the device 110. Similarly, the incident sound waves may propagate through the air in a second direction (e.g., toward the second candidate wall 414) until they reach the second candidate wall 414, at which point the second reflected sound waves (2) may be reflected by the second candidate wall 414 and propagate through the air until being detected the microphone array 112 at the top of the device 110.

As discussed above, a loudspeaker-microphone distance $d(0)$ associated with incident sound waves (e.g., direct sound) may be determined based on a first peak in the aggregate impulse response data, which may correspond to a time-offset of the room impulse response data. A first distance traveled by the first reflected sound waves (1) may be determined based on a first time delay from when the microphone array 112 detected the incident sound waves (e.g., direct sound) to when the microphone array 112 detected the first reflected sound waves (1) (e.g., second peak in the room impulse response data). Thus, the first distance may be determined by summing the loudspeaker-microphone distance $d(0)$ (e.g., distance corresponding to the time delay between the loudspeaker(s) 114 generating the audible sound(s) and the microphone array 112 detecting the incident sound waves) and a first peak distance $d(n_1)$ (e.g., distance corresponding to the first time delay associated with the second peak in the room impulse response data). Similarly, a second distance traveled by the second reflected sound waves (2) may be determined based on a second time delay from when the microphone array 112 detected the incident sound waves to when the microphone array 112 detected the second reflected sound waves (2) (e.g., third peak in the room impulse response data). Thus, the second distance may be determined by summing the loudspeaker-microphone distance $d(0)$ (e.g., distance corresponding to the time delay between the loudspeaker(s) 114 generating the audible sound(s) and the microphone array 112 detecting the incident sound waves) and a second peak distance $d(n_2)$ (e.g., distance corresponding to the second time delay associated with the third peak in the room impulse response data).

The device 110 may determine a distance from the device 110 to a wall candidate using trigonometry. For example, as the device 110 knows the distance traveled by the reflected sound waves (e.g., $d(n_P)=d(0)+n \cdot T_s \cdot 343$ m/s) and the loudspeaker-microphone distance $d(0)$, the device 110 may estimate a wall distance $w(n_p)$ using the Pythagorean theorem (e.g., $a^2+b^2=c^2$). As illustrated in FIG. 4, a straight line from the device 110 to the second candidate wall 414 (e.g., b) bisects the path of the second reflected sound waves (2), creating a right triangle. A first side (e.g., "a") of the triangle has a length equal to half of the loudspeaker-microphone distance $d(0)$ (e.g., $a=d(0)/2$), a second side (e.g., "b") of the triangle corresponds to the wall distance $w(n_p)$ (e.g., $b=w(n_p)$), and a third side (e.g., "c") of the triangle has a length equal to half of the distance traveled by the second reflected sound waves (2) (e.g., $c=(d(0)+d(n_p))/2$).

The device 110 may determine the wall distance $w(n_p)$ associated with the second candidate wall 414 using the following equation:

$$w(n_p) = \sqrt{\left(\frac{d(n_p)+d(0)}{2}\right)^2 - \left(\frac{d(0)}{2}\right)^2} \qquad [6]$$

where $w(n_p)$ is the wall distance associated with the second candidate wall 414, $d(n_p)$ is the second peak distance corresponding to the second time delay associated with the second peak in the room impulse response data, and $d(0)$ is the loudspeaker-microphone distance. In addition to the wall distance, the device 110 may also use trigonometry to determine an elevation angle associated with the second candidate wall 414.

While the examples described above refer to determining room impulse response data corresponding to a single room impulse response, the disclosure is not limited thereto and the device 110 may extend the techniques described above to determine room impulse response data corresponding to multiple room impulse responses without departing from the disclosure. For example, the device 110 may perform beamforming to generate directional audio data corresponding to a plurality of directions and may determine room impulse response data for individual direction(s) of the plurality of directions. Thus, if the device 110 detects an acoustically reflective surface in room impulse response data corresponding to a particular direction, the device 110 may determine a distance of the acoustically reflective surface and associate the distance and/or the acoustically reflective surface with the particular direction.

As illustrated in FIG. 1, the device 110 may receive (130) playback audio data associated with the loudspeaker(s) 114 and may receive (132) microphone audio data from two or more microphones included in the microphone array 112. For example, the loudspeaker(s) 114 may generate audible sound(s) (e.g., output audio) based on the playback audio data and the microphone audio data may include a representation of at least a portion (e.g., echo) of the audible sound(s). The device 110 may estimate (134) impulse response data based on the playback audio data and the microphone audio data, as discussed above with regard to FIGS. 2-4. For example, the device 110 may determine first impulse response data associated with a first audio signal from a first microphone of the microphone array 112, may determine second impulse response data associated with a second audio signal from a second microphone of the microphone array 112, and so on. Additionally or alternatively, the device 110 may perform beamforming to generate directional audio data corresponding to a plurality of directions prior to generating the room impulse response data. Thus, the device 110 may determine first impulse response data associated with a first audio signal associated with a first direction, may determine second impulse response data associated with a second audio signal associated with a second direction, and so on without departing from the disclosure. The device 110 may determine the impulse response data based on differences between the playback audio data and the microphone audio data as well as Equations [2]-[3] described above.

In some examples, the device 110 may perform step 134 using an echo canceller such as an AEC component or an MC-AEC component without departing from the disclosure.

For example, the AEC component may include an adaptive filter and may adapt a plurality of filter coefficient values of the adaptive filter while performing echo cancellation. Thus, the device 110 may estimate the impulse response data using the filter coefficient values of the adaptive filter. This may improve efficiency of the device 110, as the device 110 uses existing components instead of separately estimating the impulse response data using an additional component. Further, as the AEC component is robust against background noise and background speech, the impulse response data estimated by the AEC component may be more accurate than impulse response data estimated by separate components. In addition, as an MC-AEC component is configured to support multiple reference signals associated with multiple loudspeaker(s) 114, the impulse response data generated by the MC-AEC component may be more accurate than other techniques that directly estimate the impulse response data separately from the MC-AEC component.

The device 110 may perform step 134 in the background whenever playback audio data is being output to the loudspeaker(s) 114 (e.g., whenever a user is listening to music). Thus, the device 110 may determine the room impulse response data based on the output audio selected by the user instead of requiring the device 110 to output a particular sound (e.g., beep, chirp, white noise, etc.) that may be audible to the user. However, the disclosure is not limited thereto and the device 110 may perform step 134 during an initialization process, such as using a fixed output signal (e.g., white noise or other impulse) that is audible to the user, without departing from the disclosure.

As the impulse response data generated by the AEC component may not be accurate when the AEC component is not operating in a normal range (e.g., in good conditions), the device 110 may verify (136) that signal quality metrics satisfy a condition. For example, the device 110 may determine an echo return loss enhancement (ERLE) value and determine that the ERLE value satisfies the condition when the ERLE value is above a threshold value. However, the disclosure is not limited thereto and the device 110 may verify that the signal quality metrics satisfy the condition using any technique known to one of skill in the art without departing from the disclosure. When the signal quality metrics satisfy the condition, the device 110 may use the estimated impulse response data to determine acoustic environment classification data and corresponding filter coefficient data, as described below. When the signal quality metrics do not satisfy the condition, however, the device 110 may continue to use previous parameters (e.g., filter coefficient data) until the signal quality metrics satisfy the condition.

A quantity is subject to exponential decay if it decreases at a rate proportional to its current value. For example, every reflection is subject to free space decay (e.g., assuming perfect reflectivity, an amplitude follows the ratio $$\frac{r(n_1)}{r(n_2)} = \frac{d(n_2)}{d(n_1)},$$

where d(n) corresponds to distance traveled). This means that given a lag index n (e.g., reflection number), the expected amplitude of a reflection is deterministic. Symbolically, this can be expressed as a differential equation $$\left(\text{e.g.,}\ \frac{dN}{dt} = -\lambda N\right),$$

where N is the quantity and $\lambda$ is a positive rate called the exponential decay constant. The solution to this equation is $N(t)=N_0 e^{-\lambda t}$, where N(t) is the quantity at time t and $N_0$=N(0) is the initial quantity (e.g., quantity at time t=0).

In some examples, the device 110 may use the room impulse response data to detect an acoustically reflective surface and/or determine a distance to the acoustically reflective surface (e.g., candidate wall). For example, in some examples the device 110 may optionally estimate a wall distance and/or direction, as described above with regard to FIG. 4. To do this, the device 110 may detect a first peak in the room impulse response data that corresponds to direct sound (e.g., incident sound waves propagating directly from the loudspeaker(s) 114 to the first microphone) and may determine a first distance based on a first time delay associated with the first peak. For example, the first time delay is proportional to the first distance traveled by the incident sound waves and the first distance can be determined based on the speed of sound (e.g., sound waves travel approximately 34.3 centimeters per 1 millisecond).

Knowing the first time delay, the device 110 may determine the first distance, which corresponds to a loudspeaker-microphone distance d(0) (e.g., distance between the loudspeaker(s) 114 and the first microphone). The device 110 may determine the first distance (e.g., d(0)) by multiplying the first time delay by the speed of sound (e.g., 343 m/s). Additionally or alternatively, the device 110 may already know the loudspeaker-microphone distance d(0) based on a configuration of the device 110 (e.g., the device 110 is programmed with the fixed distance between the loudspeaker(s) 114 and the microphone array 112). Knowing the speaker-microphone distance d(0), the device 110 may determine a distance travelled by each reflection in the room impulse response data, as discussed in greater detail above.

Similarly, the device 110 may detect a second peak in the room impulse response data that corresponds to a reflection (e.g., reflected sound waves reflected by an acoustically reflective surface, such as a wall) and may determine a second distance based on a second time delay associated with the second peak.

After estimating a wall distance and/or direction for each acoustically reflective surface, the device 110 may determine (138) acoustic environment classification data indicating an acoustic environment classification. For example, the device 110 may determine a number of acoustically reflective surfaces in proximity to the device 110, may optionally determine a distance associated with each of the acoustically reflective surfaces, and may use this information to determine a position of the device 110 relative to nearest acoustically reflective surfaces.

In some examples, the acoustic environment classification may correspond to only three classifications; a free classification (e.g., no acoustically reflective surfaces in proximity to the device 110, such as when the device 110 is positioned in the middle of an open room), a wall classification (e.g., a single acoustically reflective surface in proximity to the device 110, such as when the device 110 is positioned along a wall on one side but open on three sides), and a corner classification (e.g., two acoustically reflective surfaces in proximity to the device 110, such as when the device 110 is positioned in a corner with a wall on two sides but open on the other two sides). Thus, the device 110 may generate acoustic environment classification data indicating that the device 110 is in one of the three classification based on a number of the acoustically reflective surfaces detected by the device 110 detected within a certain time delay range and/or distance.

Additionally or alternatively, the project classification may correspond to a plurality of different classifications. For example, the device 110 may distinguish between a first wall classification (e.g., first distance between the device 110 and the wall), a second wall classification (e.g., second distance between the device 110 and the wall), and/or the like. Additionally or alternatively, the device 110 may distinguish between a plurality of wall classifications based on a relative distance to the wall and/or between a plurality of corner classifications based on relative distances to both walls without departing from the disclosure.

In some examples, the acoustic environment classification may correspond to specific directions and/or distances to the acoustically reflective surfaces. Thus, while the examples described above grouped similar configurations together and identified acoustic environment classifications associated with the grouping, the disclosure is not limited thereto and the device 110 may determine unique parameters based on the specific directions/distances without departing from the disclosure.

Using the acoustic environment classification data, the device 110 may determine (140) filter coefficient data and may generate (142) output audio data using the filter coefficient data. For example, the filter coefficient data may correspond to a digital filter that performs sound equalization and the device 110 may apply the filter coefficient data to modify the output audio data prior to sending the output audio data to the loudspeaker(s) 114. However, the disclosure is not limited thereto and the device 110 may use the acoustic environment classification data to improve beamforming, beam selection, device arbitration, echo cancellation, and/or the like without departing from the disclosure.

In some examples, the device 110 may determine the filter coefficient data by selecting pre-generated filter coefficient data from a database using the acoustic environment classification data. Thus, the device 110 does not generate the filter coefficient data in response to the acoustic environment classification data, but instead identifies filter coefficient data that is associated with the acoustic environment classification data. However, the disclosure is not limited thereto and in other examples the device 110 may generate the filter coefficient data based on the acoustic environment classification data and/or modify the pre-generated filter coefficient data without departing from the disclosure. For example, the device 110 may adjust parameters based on the actual direction(s) and/or distance(s) associated with the acoustic environment classification data without departing from the disclosure.

Figure 5A:
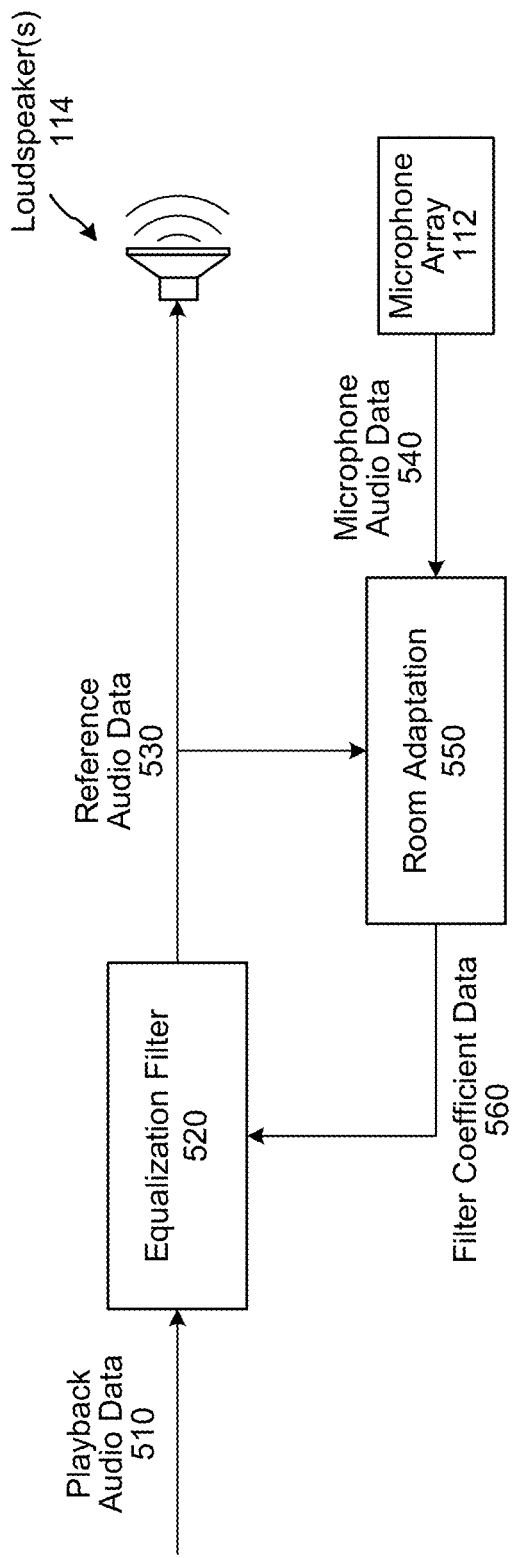
FIGS. 5A-5B illustrate example component diagrams according to embodiments of the present disclosure.
Figure 5B:
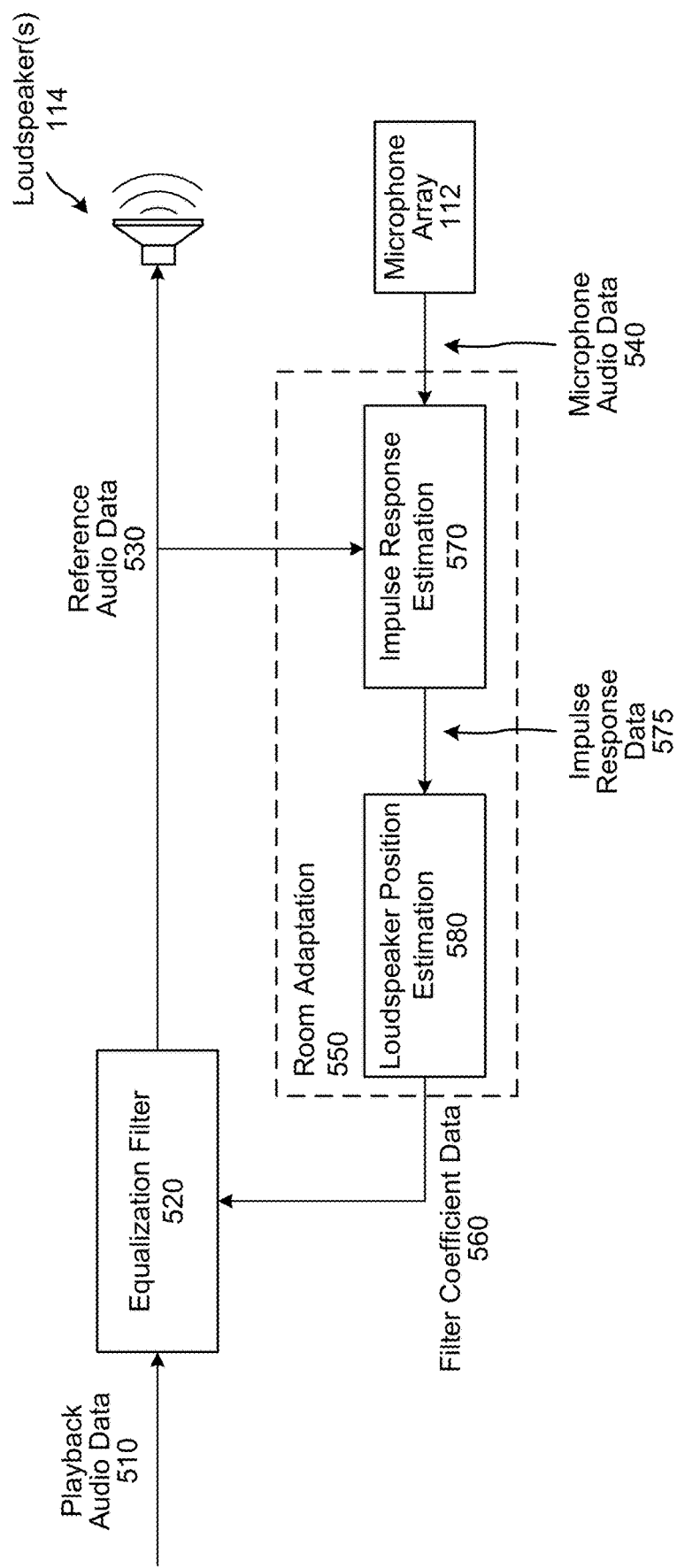

FIGS. 5A-5B illustrate example component diagrams according to embodiments of the present disclosure. As illustrated in FIG. 5A, the device 110 may send playback audio data 510 to be output to the loudspeaker(s) 114 to an equalization filter component 520. After receiving the playback audio data 510 and filter coefficient data 560, the equalization filter component 520 may modify the playback audio data 510 to generate reference audio data 530 and may send the reference audio data 530 to the loudspeaker(s) 114. For example, the equalization filter 520 may apply the filter coefficient data from step 140 (e.g., filter coefficient data 560) using a digital filter or the like to generate the reference audio data 530.

The equalization filter 520 may also send the reference audio data 530 to a room adaptation component 550, which may also receive microphone audio data 540 from the microphone array 112. Using the reference audio data 530 and the microphone audio data 540, the room adaptation 550 may estimate an impulse response, determine direction(s) and/or distance(s) associated with acoustically reflective surface(s), estimate an acoustic environment classification associated with the device 110, and/or generate the filter coefficient data 560. The room adaptation 550 may then send the filter coefficient data 560 to the equalization filter 520 for subsequent audio processing by the equalization filter 520.

As illustrated in FIG. 5B, the room adaptation component 550 may include an impulse response estimation component 570 and a loudspeaker position estimation component 580. Thus, the impulse response estimation component 570 may be configured to generate the impulse response data (e.g., estimate the impulse response), while the loudspeaker position estimation component 580 may be configured to determine the acoustic environment classification data (e.g., estimate the acoustic environment classification) and/or generate the filter coefficient data 560. In some examples, the impulse response estimation component 570 may correspond to the AEC component itself, such that the loudspeaker position estimation component 580 may receive the impulse response data from the AEC component. However, the disclosure is not limited thereto, and in other examples the impulse response estimation component 570 may receive a plurality of filter coefficient values associated with an adaptive filter from the AEC component and may generate the impulse response data using the plurality of filter coefficient values without departing from the disclosure.

While FIGS. 5A-5B illustrate a variety of components directly communicating, this is intended for illustrative purposes and the disclosure is not limited thereto. Instead, the device 110 may include intermediary components that are not illustrated in FIGS. 5A-5B without departing from the disclosure. For example, the device 110 may include a beamformer that is configured to receive the microphone audio data 540, generate directional audio data based on the microphone audio data 540, and send the directional audio data to the room adaptation component 550 without departing from the disclosure.

While FIGS. 5A-5B illustrate the device 110 using the room adaptation component 550 to control the equalization filter 520, the disclosure is not limited thereto. Instead, the room adaptation component 550 may send acoustic environment classification data to other components and the device 110 may use the acoustic environment classification data to improve beamforming, beam selection, device arbitration, echo cancellation, and/or the like without departing from the disclosure.

FIGS. 6A-6C illustrate examples of determining acoustic environment classifications according to embodiments of the present disclosure. As illustrated in FIG. 6A, in some examples the device 110 may send microphone audio data 610 to fixed beamformer (FBF) components 620 and the FBF components 620 (illustrated as FBFs 620) may generate directional audio data 630.

In the example illustrated in FIG. 6A, the microphone audio data 610 corresponds to four input channels (e.g., four audio signals 610a-610d corresponding to four microphones a-d), whereas the FBF components 620 correspond to eight output channels (e.g., eight directional audio signals 630a-630h corresponding to eight different directions a-h). However, the disclosure is not limited thereto and the number of microphones, input channels, FBF components 620, output channels, and/or the like may vary without departing from the disclosure. For example, the number of microphones and/or input channels may be different from four (e.g., 2, 3, 4, 5, 6, etc.), the number of FBF components 620 and/or the output channels may be different from eight (e.g., 6, 8, 12, 16, etc.), and/or a single FBF component 620 may generate the directional audio data 630 without departing from the disclosure. Additionally or alternatively, the number of microphones (and corresponding microphone signals) may be equal to and/or different from the number of FBF components 620 (and corresponding directional signals) without departing from the disclosure.

The FBF components 620 may send the directional audio data 630 to corresponding room impulse response (RIR) generator components 640 to generate room impulse response RIR data 645. For example, a first FBF component 620a may send first directional audio data 630a corresponding to a first direction to a first RIR generator component 640a to generate first RIR data 645a, a second FBF component 620b may send second directional audio data 630b corresponding to a second direction to a second RIR generator component 640b to generate second RIR data 645b, a third FBF component 620c may send third directional audio data 630c corresponding to a third direction to a third RIR generator component 640c to generate third RIR data 645c, and so on. While FIG. 6A illustrates separate RIR generator components 640, the disclosure is not limited thereto and a single RIR generator component 640 may generate the RIR data 645 for a plurality of directions without departing from the disclosure.

In addition to the directional audio data 630, the RIR generator components 640 may also receive playback audio data 605. Using the directional audio data 630 and the playback audio data 605, the RIR generator components 640 may generate the RIR data 645 by determining impulse responses corresponding to each direction. For example, the first RIR generator component 640a may compare the first directional audio data 630a to the playback audio data 605 to generate first RIR data 645a corresponding to the first direction, the second RIR generator component 640b may compare the second directional audio data 630b to the playback audio data 605 to generate second RIR data 645b corresponding to the second direction, the third RIR generator component 640c may compare the third directional audio data 630c to the playback audio data 605 to generate third RIR data 645c corresponding to the third direction, and so on.

The RIR generator components 640 may send the RIR data 645 to reflection detector components 650, which may detect acoustically reflective surface(s), and/or determine distance(s) to the acoustically reflective surface(s) as described in greater detail above. For example, a first reflection detector component 650a may detect a peak in the first RIR data 645a, may optionally determine a first distance associated with the peak, and may generate first reflection data 655a that indicates that an acoustically reflective surface is detected in the first direction and/or the first distance corresponding to the acoustically reflective surface.

The reflection detector components 650 may send the reflection data 655 corresponding to the plurality of directions to decision logic component 660 to generate acoustic environment classification data 670. For example, the first reflection detector component 650a may send the first reflection data 655a corresponding to the first direction, the second reflection detector component 650b may send second reflection data 655b corresponding to the second direction, the third reflection detector component 650c may send third reflection data 655b corresponding to the third direction, and so on.

The decision logic component 660 may receive the reflection data 655 corresponding to each of the directions, may determine direction(s) and/or distance(s) associated with acoustically reflective surfaces, and may generate the acoustic environment classification data 670 based on a relative position of the device 110 with regard to these acoustically reflective surfaces.

FIG. 6B illustrates three examples of acoustic environment classifications to illustrate the three main classifications. As illustrated in FIG. 6B, a free classification 690 corresponds to the device 110 being positioned in the open away from any acoustically reflective surfaces. Thus, the reflection data 655 indicates that an acoustically reflective surface was not detected in any of the directions (e.g., 655a-655h represent "no," indicating that no reflections were detected in the impulse response data generated by the RIR generator components 640). This is illustrated in FIG. 6B as the device 110 having separation from a first physical wall 682 (e.g., wall in front of the device 110) and a second physical wall 684 (e.g., wall to the left of the device 110).

In contrast, a wall classification 692 corresponds to the device 110 being positioned in proximity to (e.g., next to, within a certain distance of, below a distance threshold from, etc.) a single acoustically reflective surface. Thus, the reflection data 655 indicates that a single acoustically reflective surface was detected in a single direction (e.g., 655a represents "yes," indicating that a reflection was detected in the first direction a, while 655b-655h represent "no," indicating that no reflections were detected in the remaining directions b-h). This is illustrated in FIG. 6B as the device 110 being positioned in proximity to the first physical wall 682 (e.g., wall in front of the device 110) but having separation from the second physical wall 684 (e.g., wall to the left of the device 110).

Similarly, FIG. 6B illustrates a corner classification 694 that corresponds to the device 110 being positioned in proximity to (e.g., next to, within a certain distance of, below a distance threshold from, etc.) two acoustically reflective surfaces. Thus, the reflection data 655 indicates that two acoustically reflective surfaces were detected in two separate directions (e.g., 655a and 655g represent "yes," indicating that a reflection was detected in the first direction a [0 degrees] and the seventh direction g [270 degrees], while 655b-655h represent "no," indicating that no reflections were detected in the remaining directions b-f and h). This is illustrated in FIG. 6B as the device 110 being positioned in proximity to the first physical wall 682 (e.g., wall in front of the device 110) and the second physical wall 684 (e.g., wall to the left of the device 110).

While FIG. 6B illustrates three acoustic environment classifications, this is intended for ease of illustration and the disclosure is not limited thereto. Instead, the device 110 may generate and/or select from a plurality of acoustic environment classifications without departing from the disclosure. For example, a "cabinet classification" may correspond to the device 110 being positioned in a cabinet, which the device 110 may detect by determining that the device 110 is positioned in a first corner classification along a horizontal plane and a second corner classification along a vertical plane.

In some examples, the device 110 may determine distance(s) associated with the acoustically reflective surface(s). FIG. 6C illustrates two examples of determining distances along with directions associated with acoustically reflective surfaces. For example, FIG. 6C illustrates a corner classification 696 that corresponds to the device 110 being positioned in proximity to (e.g., next to, within a certain distance of, below a distance threshold from, etc.) two acoustically reflective surfaces. Thus, the reflection data 655 indicates that two acoustically reflective surfaces were detected in two separate directions (e.g., 655a and 655g represent "yes," indicating that a reflection was detected in the first direction a [0 degrees] and the seventh direction g [270 degrees], while 655b-655h represent "no," indicating that no reflections were detected in the remaining directions b-f and h). This is illustrated in FIG. 6C as the device 110 being positioned in proximity to the first physical wall 682 (e.g., wall in front of the device 110) and the second physical wall 684 (e.g., wall to the left of the device 110). In addition, the first reflection data 655a indicates that the first physical wall 682 is located 45 cm from the device 110 in the first direction, while the seventh reflection data 655g indicates that the second physical wall 684 is located 45 cm from the device 110 in the seventh direction.

Similarly, FIG. 6C illustrates a corner classification 698 that corresponds to the device 110 being at a different relative position in the corner from the corner classification 696. For example, the first reflection data 655a indicates that the first physical wall 682 is located 45 cm from the device 110 in the first direction, but the seventh reflection data 655g indicates that the second physical wall 684 is located 90 cm from the device 110 in the seventh direction. Thus, the device 110 is positioned twice as far from the second physical wall 684 as the first physical wall 682, as illustrated in FIG. 6C.

While FIG. 6C illustrates only two corner classifications, the disclosure is not limited thereto and the device 110 may determine a plurality of different corner classifications without departing from the disclosure. For example, the device 110 may distinguish between multiple corner classifications based on a ratio between a first distance associated with the first physical wall 682 and a second distance associated with the second physical wall 684. To illustrate some examples, the corner classification 696 corresponds to a ratio of 1:1 (e.g., equal distance between the device 110 and the first physical wall 682 and the second physical wall 684), whereas the corner classification 698 corresponds to a ratio of 1:2 (e.g., the second physical wall 684 is twice as far as the first physical wall 682).

While the example described above calculate the ratio based on a fixed perspective (e.g., first distance relative to the second distance), the disclosure is not limited thereto and the device 110 may determine the ratio based on a shorter distance (e.g., which physical wall is closer to the device 110 at any given time) without departing from the disclosure. For example, a 1:2 ratio may correspond to both (i) when the first physical wall 682 is located 45 cm from the device 110 and the second physical wall 684 is located 90 cm from the device 110 and (ii) when the second physical wall 684 is located 45 cm from the device 110 and the first physical wall 682 is located 90 cm from the device 110.

Additionally or alternatively, while the examples described above describe the device 110 determining the corner classification based on estimated distances to the physical walls, the disclosure is not limited thereto. In some examples, the device 110 may determine the acoustic environment classification without estimating distance(s) to the physical walls. Therefore, the device 110 may distinguish between different corner classifications without estimating the distance(s). For example, the device 110 may distinguish between different corner classifications based on a relative power of the reflections, a time delay associated with the reflections, and/or any other techniques known to one of skill in the art without departing from the disclosure.

While FIG. 6C illustrates examples of the device 110 distinguishing between different corner classifications, the disclosure is not limited thereto and the device 110 may use the techniques illustrated in FIG. 6C to distinguish between different wall classifications without departing from the disclosure. For example, the device 110 may determine that a first distance (e.g., 45 cm) corresponds to a first wall classification whereas a second distance (e.g., 90 cm) corresponds to a second wall classification without departing from the disclosure.

Figure 7:
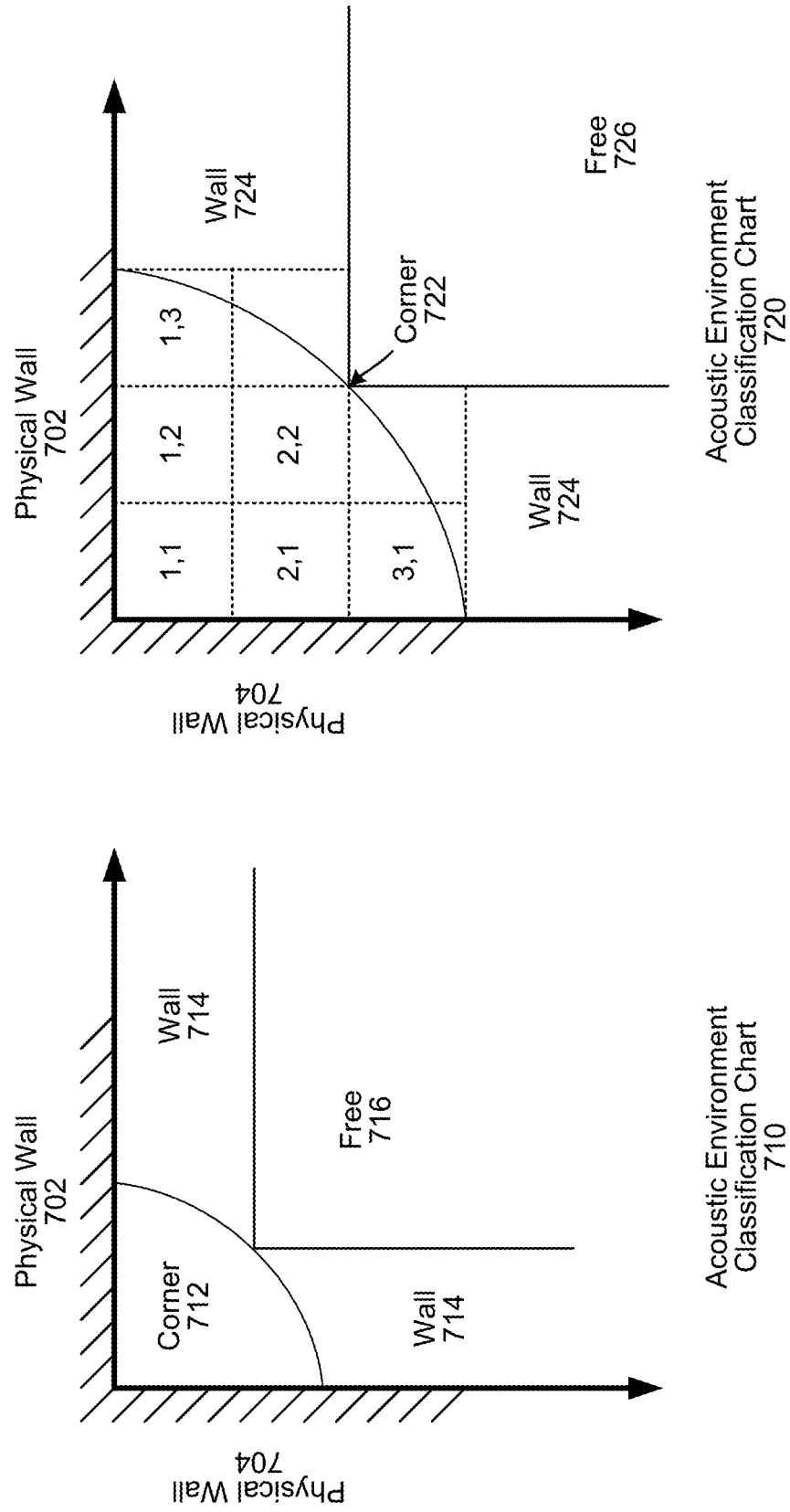
FIG. 7 illustrates an example of different acoustic environment classifications according to embodiments of the present disclosure.

FIG. 7 illustrates an example of different acoustic environment classifications according to embodiments of the present disclosure. FIG. 7 illustrates an acoustic environment classification chart 710 that illustrates potential positions of the device 110 being classified as one of three acoustic environment classifications. As illustrated in FIG. 7, a corner classification 712 corresponds to the device 110 being in proximity (e.g., below a distance threshold) to both a first physical wall 702 and a second physical wall 704, a wall classification 714 corresponds to the device 110 only being in proximity to a single wall (e.g., either the first physical wall 702 along the top right or the second physical wall 704 along the bottom left), and a free classification 716 corresponds to the device 110 not being in proximity (e.g., above the distance threshold) to either the first physical wall 702 or the second physical wall 704.

In some examples, the device 110 may distinguish between multiple positions in the corner classification 712. For example, FIG. 7 illustrates an acoustic environment classification chart 720 that illustrates potential positions of the device 110 being classified as one of three major acoustic environment classifications and subdivides the corner classification into six different sections, for a total of either six or eight acoustic environment classifications (e.g., depending on whether subdivision (2,1) is grouped with or separated from subdivision (1,2), and whether subdivision (3,1) is grouped with or separated from subdivision (1,3)). As illustrated in FIG. 7, a corner classification 722 corresponds to the device 110 being in proximity (e.g., below a distance threshold) to both the first physical wall 702 and the second physical wall 704, a wall classification 724 corresponds to the device 110 only being in proximity to a single wall (e.g., either the first physical wall 702 along the top right or the second physical wall 704 along the bottom left), and a free classification 726 corresponds to the device 110 not being in proximity (e.g., above the distance threshold) to either the first physical wall 702 or the second physical wall 704.

In addition, the corner classification 722 includes six subdivisions, represented as a first subdivision (1,1), a second subdivision (1,2), a third subdivision (1,3), a fourth subdivision (2,1), a fifth subdivision (2,2), and a sixth subdivision (3,1). As mentioned above, the device 110 may treat some subdivisions as equivalent regardless of position by determining a ratio between a smaller distance and a larger distance. For example, the device 110 may group the second subdivision (1,2) and the fourth subdivision (2,1) in a first acoustic environment classification/subclassification (e.g., ratio of 1:2) and group the third subdivision (1,3) and the sixth subdivision (3,1) in a second acoustic environment classification/subclassification (e.g., ratio of 1:3). However, while the first subdivision (1,1) and the fifth subdivision (2,2) have the same ratio between the smaller distance and the larger distance (e.g., ratio of 1:1), the device 110 may distinguish between them based on the overall distance between the device 110 and the nearest wall.

Using the techniques described above, the device 110 may distinguish between six acoustic environment classifications; first corner classification [subdivision (1,1)], second corner classification [subdivision (1,2) and subdivision (2,1)], third corner classification [subdivision (1,3) and subdivision (3,1)], fourth corner classification [subdivision (2,2,)], wall classification 724, and/or free classification 726. However, the disclosure is not limited thereto and the device 110 may combine the first subdivision (1,1) and the fifth subdivision (2,2) for a total of five acoustic environment classifications, may separate the combined subdivisions for a total of eight acoustic environment classifications, and/or the like without departing from the disclosure. Additionally or alternatively, the device 110 may distinguish between multiple wall classifications based on a distance to the nearest physical wall without departing from the disclosure.

While FIG. 7 illustrates examples of several acoustic environment classifications (e.g., corner classification 722, wall classification 724, free classification 726), the disclosure is not limited thereto and the device 110 may identify additional classifications not illustrated in FIG. 7. For example, the corner classification 722 illustrated in FIG. 7 corresponds to an "inside corner" configuration, in which the device 110 is in close proximity to two acoustically reflective surfaces that cause reflections in 270 degrees around the device 110. In contrast, the device 110 may be located on the other side of both the first physical wall 702 and the second physical wall 704, corresponding to an "outside corner" configuration. While the device 110 would still be in close proximity to the two acoustically reflective surfaces, they would cause reflections for only 90 degrees around the device 110 (e.g., lower right quadrant). The device 110 may distinguish between the two acoustic environment classifications and select parameters accordingly.

While FIG. 6A illustrates an example of reflection detector components 650 receiving directional RIR data 645 and generating reflection data 655 corresponding to each of the plurality of directions, the disclosure is not limited thereto. Instead, the decision logic 660 may receive the RIR data 645 and may generate the acoustic environment classification data 670 directly, without generating any additional information associated with the plurality of directions. For example, the decision logic 660 may not determine direction(s) and/or distance(s) associated with the acoustically reflective surfaces without departing from the disclosure. In some examples, the decision logic 660 may not even receive directional RIR data 645 and may instead receive RIR data generated based on the microphone audio data 610 without any beamforming being performed. Thus, FIGS. 6A-6C are intended to conceptually illustrate examples of determining the direction(s) and/or distance(s), but the disclosure is not limited thereto.

Figure 8B:
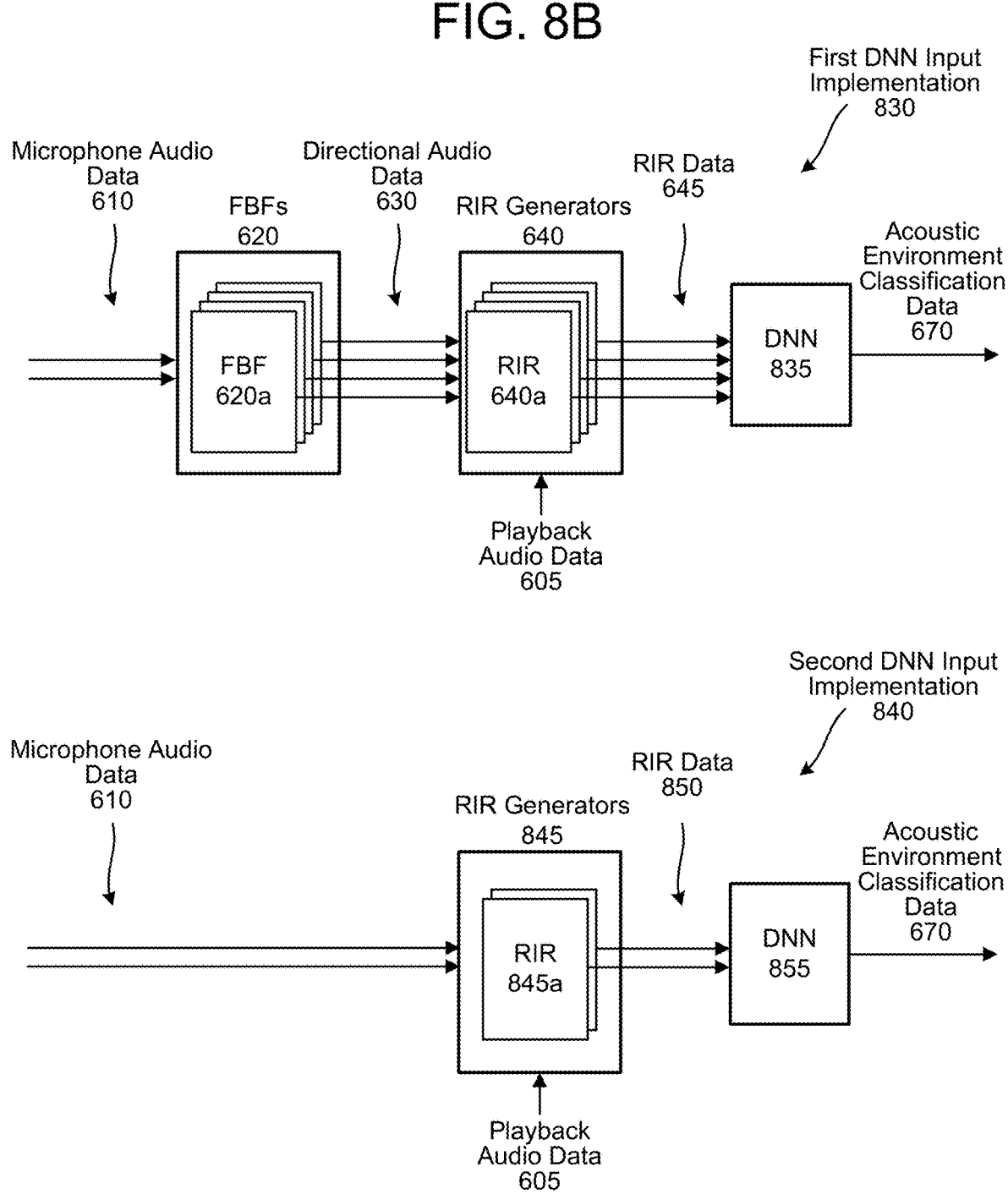
Figure 8B:
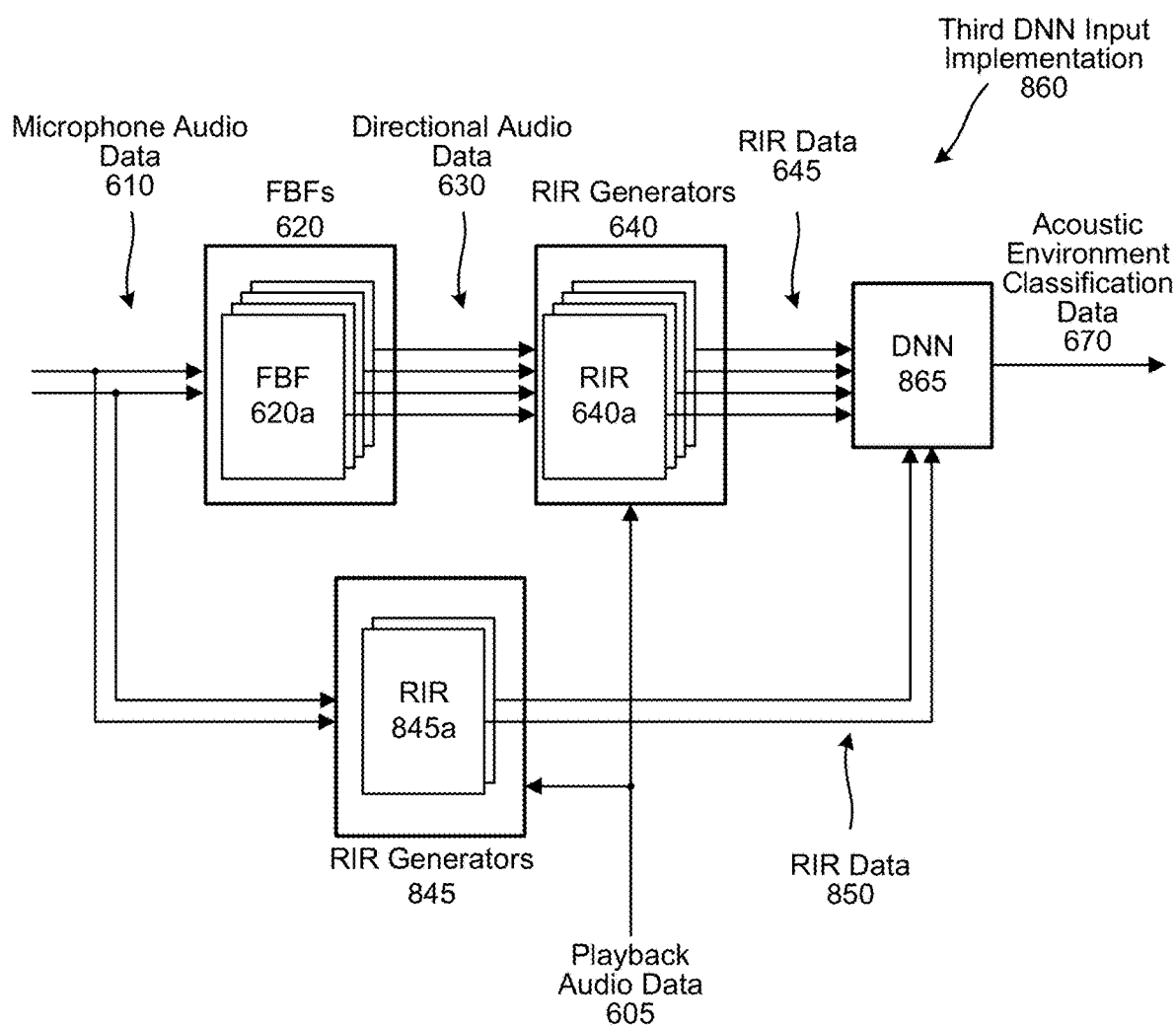

FIGS. 8A-8B illustrate examples of determining acoustic environment classifications using deep neural network(s) according to embodiments of the present disclosure. As illustrated in FIG. 8A, in some examples the device 110 may include a deep neural network (DNN) to determine the acoustic environment classification data 670 and/or the reflection data 650 without departing from the disclosure. For example, the reflection detector components 650 and/or the decision logic 660 may be replaced with a DNN component 815/825 that may receive the RIR data 645 corresponding to each direction of a plurality of directions and generate acoustic environment classification data 670 without departing from the disclosure.

As illustrated in FIG. 8A, in a first DNN output configuration 810 the DNN component 815 may receive the RIR data 645 from the RIR generator components 640 and may generate acoustic environment classification data 670. For example, the DNN component 815 may output the acoustic environment classification data 670, which indicates an acoustic environment classification corresponding to a position of the device 110 relative to acoustically reflective surfaces, but not output any information about specific direction(s) and/or distance(s) associated with the acoustically reflective surface(s). In some examples, the DNN component 815 may determine the acoustic environment classification without identifying the specific direction(s) and/or distance(s). However, the disclosure is not limited thereto and in other examples the DNN component 815 may determine the direction(s) and/or distance(s) internally but may not output this information to other components of the device 110.

As illustrated in FIG. 8A, in a second DNN output configuration 820 the DNN component 825 may receive the RIR data 645 from the RIR generator components 640 and generate both the reflection data 650 and the acoustic environment classification data 670. For example, the DNN component 825 may output the reflection data 650, which indicates direction(s) and/or distance(s) associated with the acoustically reflective surface(s), along with the acoustic environment classification data 670, which indicates an acoustic environment classification corresponding to a position of the device 110 relative to acoustically reflective surfaces. Thus, the DNN component 825 may share information about the acoustically reflective surfaces with other components of the device 110 without departing from the disclosure.

While FIG. 8A illustrates different output configurations, FIG. 8B illustrates a variety of different input configurations. For example, the DNN component may receive RIR data corresponding to a plurality of directions (e.g., RIR data 645 generated using directional audio data 630), a plurality of microphones (e.g., RIR data 850 generated using microphone audio data 610), and/or a combination thereof (e.g., RIR data 645 and RIR data 850) without departing from the disclosure.

As illustrated in FIG. 8B, a first DNN input implementation 830 includes fixed beamformer components (FBFs) 620 that receive the microphone audio data 610 and generate the directional audio data 630 corresponding to a plurality of directions. RIR generator components 640 receive the directional audio data 630, along with the playback audio data 605, and generate RIR data 645 corresponding to the plurality of directions. Thus, the DNN component 835 receives the RIR data 645 and determines the acoustic environment classification data 670. While not illustrated in FIG. 8B, the DNN component 835 may also generate the reflection data 650, as illustrated in FIG. 8A.

In contrast to the first DNN input implementation 830, a second DNN input implementation 840 does not include the FBF components 620. Instead, RIR generator components 845 receive the microphone audio data 610, along with the playback audio data 605, and generate RIR data 850 that corresponds to the two or more microphones included in the microphone array 112. Thus, the DNN component 855 receives the RIR data 850, which is not associated with particular directions, and determines the acoustic environment classification data 670. While not illustrated in FIG. 8B, the DNN component 855 may also generate the reflection data 650, as illustrated in FIG. 8A. Additionally or alternatively, while the second DNN input implementation 840 is illustrated as receiving two input channels from the microphone array 112, the disclosure is not limited thereto and the microphone audio data 610 may include any number of input channels without departing from the disclosure.

In some examples, the device 110 may combine the RIR data 645 and the RIR data 850. As illustrated in FIG. 8B, a third DNN input implementation 860 includes the components of both the first DNN input implementation 830 and the second DNN input implementation 840. Thus, the DNN component 855 receives the RIR data 645, which is associated with the plurality of directions, along with the RIR data 850, which is associated with the plurality of microphones, and the DNN component 855 determines the acoustic environment classification data 670 based on the combination of RIR data.

Various machine learning techniques may be used to train and operate models to perform various steps described above, such as user recognition feature extraction, encoding, user recognition scoring, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9A:
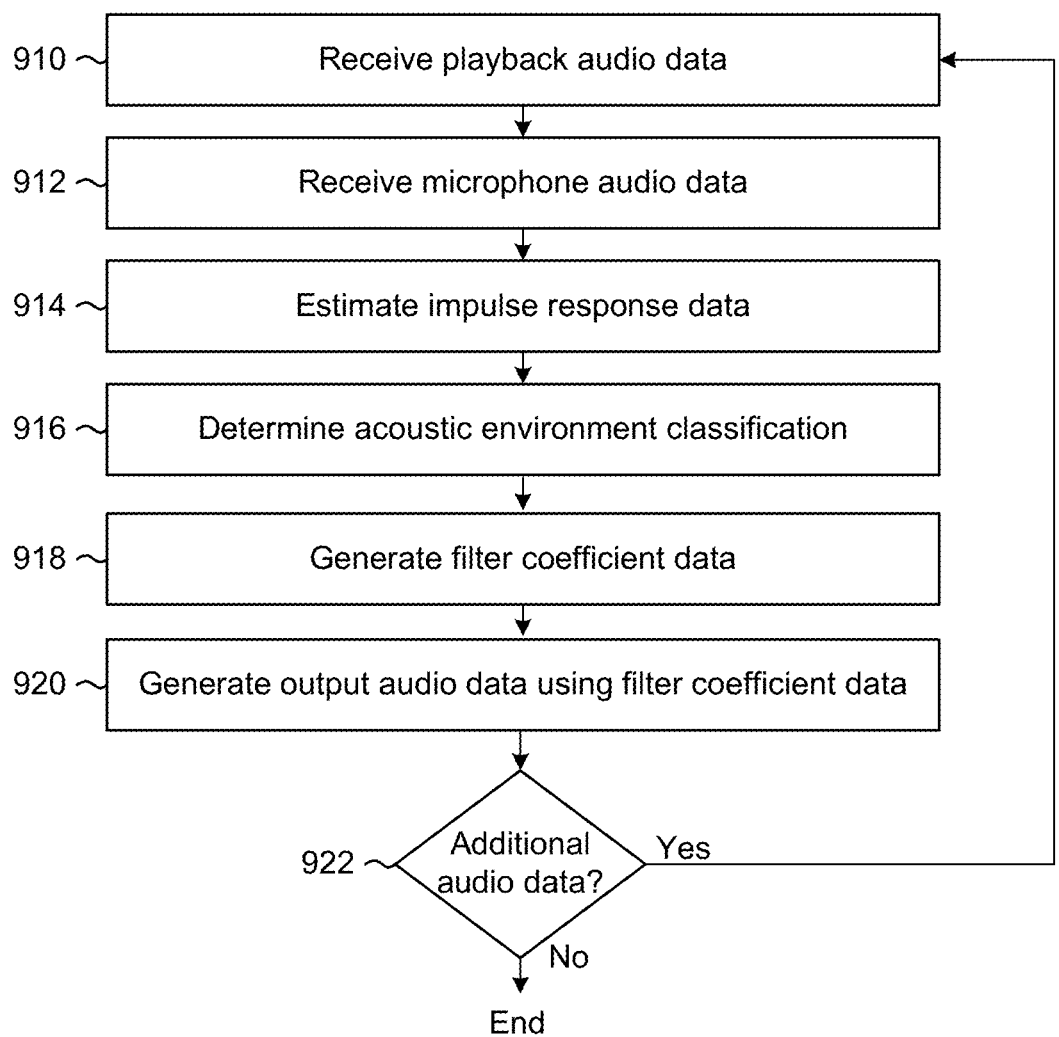
FIGS. 9A-9B are flowcharts conceptually illustrating example methods for determining an acoustic environment classification and generating output audio data based on the classification according to embodiments of the present disclosure.
Figure 9B:
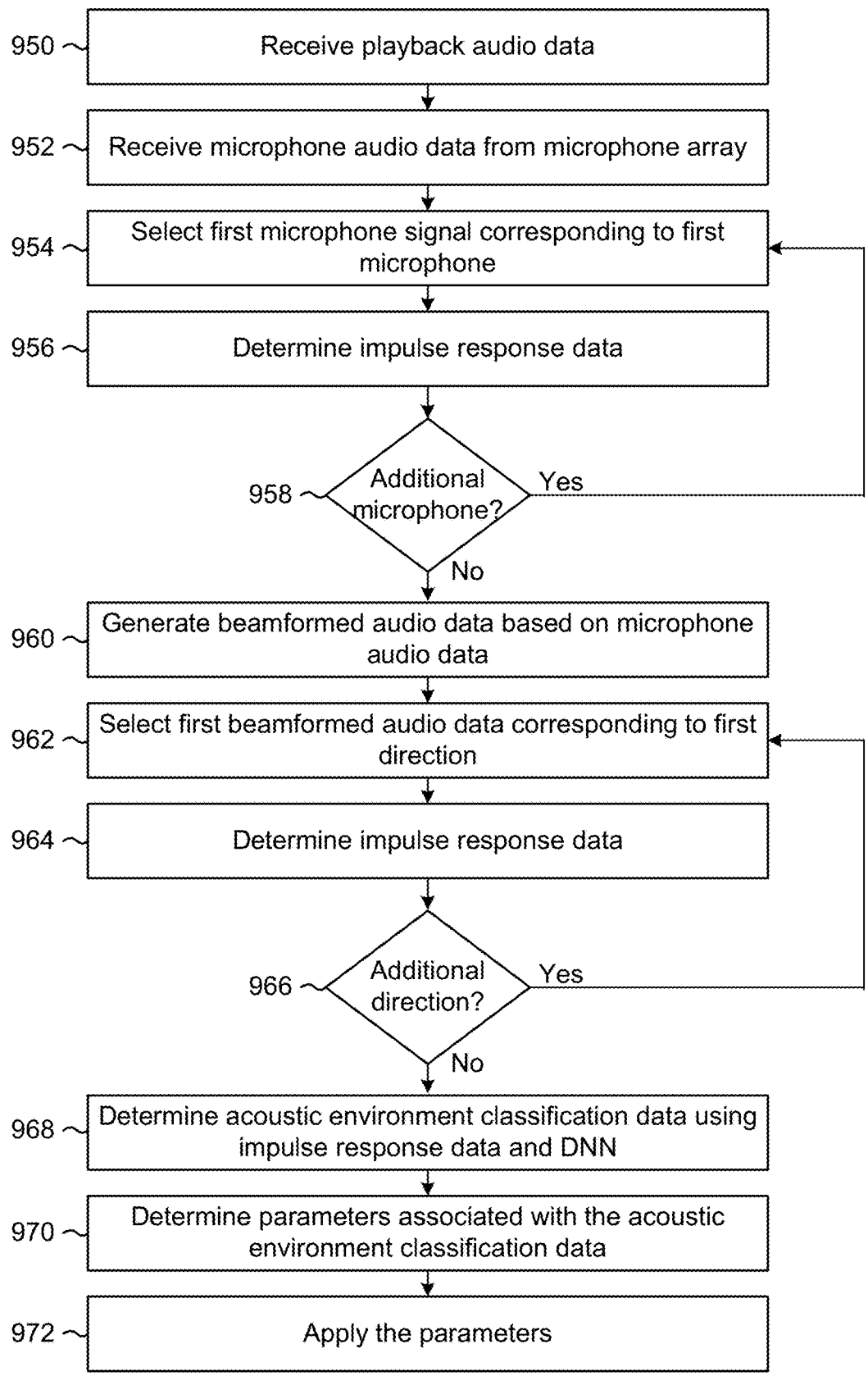

FIGS. 9A-9B are flowcharts conceptually illustrating example methods for determining an acoustic environment classification and generating output audio data based on the classification according to embodiments of the present disclosure. Similar to the steps described above with regard to FIG. 1, the device 110 may receive (910) playback audio data associated with the loudspeaker(s) 114 and may receive (912) microphone audio data from two or more microphones included in the microphone array 112. For example, the loudspeaker(s) 114 may generate audible sound(s) (e.g., output audio) based on the playback audio data and the microphone audio data may include a representation of at least a portion (e.g., echo) of the audible sound(s).

The device 110 may estimate (914) impulse response data based on the playback audio data and the microphone audio data, as discussed above with regard to FIGS. 2-4 and FIGS. 8B-8B. For example, the device 110 may determine first impulse response data associated with a first audio signal from a first microphone of the microphone array 112, may determine second impulse response data associated with a second audio signal from a second microphone of the microphone array 112, and so on. Additionally or alternatively, the device 110 may perform beamforming to generate directional audio data corresponding to a plurality of directions prior to generating the room impulse response data. Thus, the device 110 may determine first impulse response data associated with a first audio signal associated with a first direction, may determine second impulse response data associated with a second audio signal associated with a second direction, and so on without departing from the disclosure. In some examples, the device 110 may determine impulse response data using a combination of the microphone audio data and the directional audio data. For example, the device 110 may determine the impulse response data for one or more audio signals from the microphone array 112 as well as one or more directional audio signals without departing from the disclosure. The device 110 may determine the impulse response data based on differences between the playback audio data and the microphone audio data as well as Equations [2]-[3] described above.

In some examples, the device 110 may use the room impulse response data to detect an acoustically reflective surface and/or determine a distance to the acoustically reflective surface (e.g., candidate wall). For example, the device 110 may estimate a wall distance and/or direction, as described above with regard to step 136. To do this, the device 110 may detect a first peak in the room impulse response data that corresponds to direct sound (e.g., incident sound waves propagating directly from the loudspeaker(s) 114 to the first microphone) and may determine a first distance based on a first time delay associated with the first peak. For example, the first time delay is proportional to the first distance traveled by the incident sound waves and the first distance can be determined based on the speed of sound (e.g., sound waves travel approximately 34.3 centimeters per 1 millisecond). Similarly, the device 110 may detect a second peak in the room impulse response data that corresponds to a reflection (e.g., reflected sound waves reflected by an acoustically reflective surface, such as a wall) and may determine a second distance based on a second time delay associated with the second peak.

Using the first distance and the second distance and/or using the first time delay and the second time delay, the device 110 may determine the distance to the acoustically reflective surface from the device 110. When the room impulse response data is associated with a particular direction (e.g., directional audio data output by the FBFs 620), the device 110 may associate this direction with the acoustically reflective surface and may therefore determine a position of the acoustically reflective surface relative to the device 110. However, the disclosure is not limited thereto and the device 110 may detect the acoustically reflective surface without determining a distance and/or direction without departing from the disclosure.

Using the room impulse response data, the device 110 may determine (916) acoustic environment classification data indicating an acoustic environment classification associated with the device 110. For example, the device 110 may determine a position of the device 110 relative to one or more acoustically reflective surfaces and may identify a corresponding acoustic environment classification based on the relative position of the device 110. In some examples, the device 110 may determine a number of acoustically reflective surfaces in proximity to the device 110, may optionally determine a distance associated with individual acoustically reflective surfaces, may optionally determine a direction associated with the individual acoustically reflective surfaces, and may use this information to determine a position of the device 110 relative to nearest acoustically reflective surfaces.

In some examples, the acoustic environment classification may correspond to specific directions and/or distances to the acoustically reflective surfaces. Thus, while the examples described above grouped similar configurations together and identified acoustic environment classifications associated with the grouping, the disclosure is not limited thereto and the device 110 may determine unique parameters (e.g., filter coefficients) based on the specific directions/distances without departing from the disclosure.

As described above with regard to FIGS. 6A-8B, the device 110 may determine the acoustic environment classification data using discrete components (e.g., reflection detectors 650 for each room impulse response signal and decision block 660), using a deep neural network (DNN) (e.g., DNNs 815/825/835/855/865, or a combination thereof), a combination thereof (e.g., reflection detectors 650 for each room impulse response signal, with the reflection data 655 being input to a DNN instead of the decision block 660), and/or using any technique known to one of skill in the art.

Using the acoustic environment classification data, the device 110 may generate (918) filter coefficient data and may generate (920) output audio data using the filter coefficient data. For example, the filter coefficient data may correspond to a digital filter that performs sound equalization and the device 110 may apply the filter coefficient data to modify the output audio data prior to sending the output audio data to the loudspeaker(s) 114. However, the disclosure is not limited thereto and the device 110 may use the acoustic environment classification data to improve beamforming, beam selection, device arbitration, echo cancellation, and/or the like without departing from the disclosure.

The device 110 may determine (922) whether additional audio data (e.g., playback audio data and/or microphone audio data) is present and, if so, may loop to step 910 and repeat steps 910-920 for the additional audio data. For example, the device 110 may perform steps 910-920 in the background whenever playback audio data is being output to the loudspeaker(s) 114 (e.g., whenever a user is listening to music). Thus, the device 110 may determine the room impulse response data based on the output audio selected by the user instead of requiring the device 110 to output a particular sound (e.g., beep, chirp, white noise, etc.) that may be audible to the user. However, the disclosure is not limited thereto and the device 110 may perform steps 910-920 as an initialization step, such as using a fixed output signal (e.g., white noise or other impulse) that is audible to the user, without departing from the disclosure.

While FIG. 9A illustrates the device 110 looping from step 922 to step 910 constantly whenever additional audio data is present, this is intended for illustrative purposes and the disclosure is not limited thereto. For example, the device 110 may perform steps 910-922 in a constant loop whenever playback audio data is present, periodically (e.g., repeating every five minutes, hour, etc.), intermittently (e.g., in response to output audio being generated at a beginning of a user interaction, such as a first song during a series of songs), at device startup (e.g., whenever the device 110 is powered on), and/or the like without departing from the disclosure.

As illustrated in FIG. 9B, the device 110 may receive (950) playback audio data, may receive (952) microphone audio data from the microphone array 112, may select (954) a first microphone signal corresponding to a first microphone of the microphone array 112, and may determine (956) impulse response data based on the first microphone signal and the playback audio data. For example, the device 110 may perform a cross-correlation in the time domain, a cross-spectrum analysis in the frequency domain, an inter-channel response, and/or the like without departing from the disclosure.

The device 110 may determine (958) whether there is an additional microphone signal and if so, may loop to step 954 and repeat steps 954-958 for the additional microphone signal. If there are no additional microphone signals, the device 110 may generate (960) beamformed audio data based on the microphone audio data, may select (962) first beamformed audio data corresponding to the first direction, and may determine (964) impulse response data based on the first beamformed audio data and the playback audio data. As discussed above, the device 110 may determine the impulse response data by performing a cross-correlation in the time domain, a cross-spectrum analysis in the frequency domain, an inter-channel response, and/or the like without departing from the disclosure.

The device 110 may determine (966) whether there is an additional direction in the beamformed audio data and, if so, may loop to step 962 to perform steps 962-966 for the additional beamformed audio data. If there are no additional directions, the device 110 may determine (968) the acoustic environment classification data using the impulse response data (e.g., the microphone-based impulse response data determined in step 956 and the beamform-based impulse response data determined in step 964) and a DNN, as described in more detail above with regard to FIGS. 8A-8B.

Using the acoustic environment classification data, the device 110 may determine (970) parameters associated with the acoustic environment classification data and may apply (972) the parameters. In some examples, the device 110 may determine filter coefficient data and may generate output audio data using the filter coefficient data. For example, the filter coefficient data may correspond to a digital filter that performs sound equalization and the device 110 may apply the filter coefficient data to modify the output audio data prior to sending the output audio data to the loudspeaker(s) 114. However, the disclosure is not limited thereto and the device 110 may use the acoustic environment classification data to improve beamforming, beam selection, device arbitration, echo cancellation, and/or the like without departing from the disclosure. Thus, applying the parameters may correspond to steps other than generating the output audio, as the device 110 may adjust the beamformer components, a noise cancellation component, and/or the like based on the selected parameters.

In some examples, the device 110 may determine the parameters by selecting pre-generated parameters from a database using the acoustic environment classification data. Thus, the device 110 does not generate the parameters (e.g., filter coefficient data) in response to the acoustic environment classification data, but instead identifies a set of parameters that is associated with the acoustic environment classification data. However, the disclosure is not limited thereto and in other examples the device 110 may generate the parameters based on the acoustic environment classification data and/or modify the pre-generated parameters without departing from the disclosure. For example, the device 110 may adjust the parameters based on the actual direction(s) and/or distance(s) associated with the acoustic environment classification data without departing from the disclosure.

Figure 10:
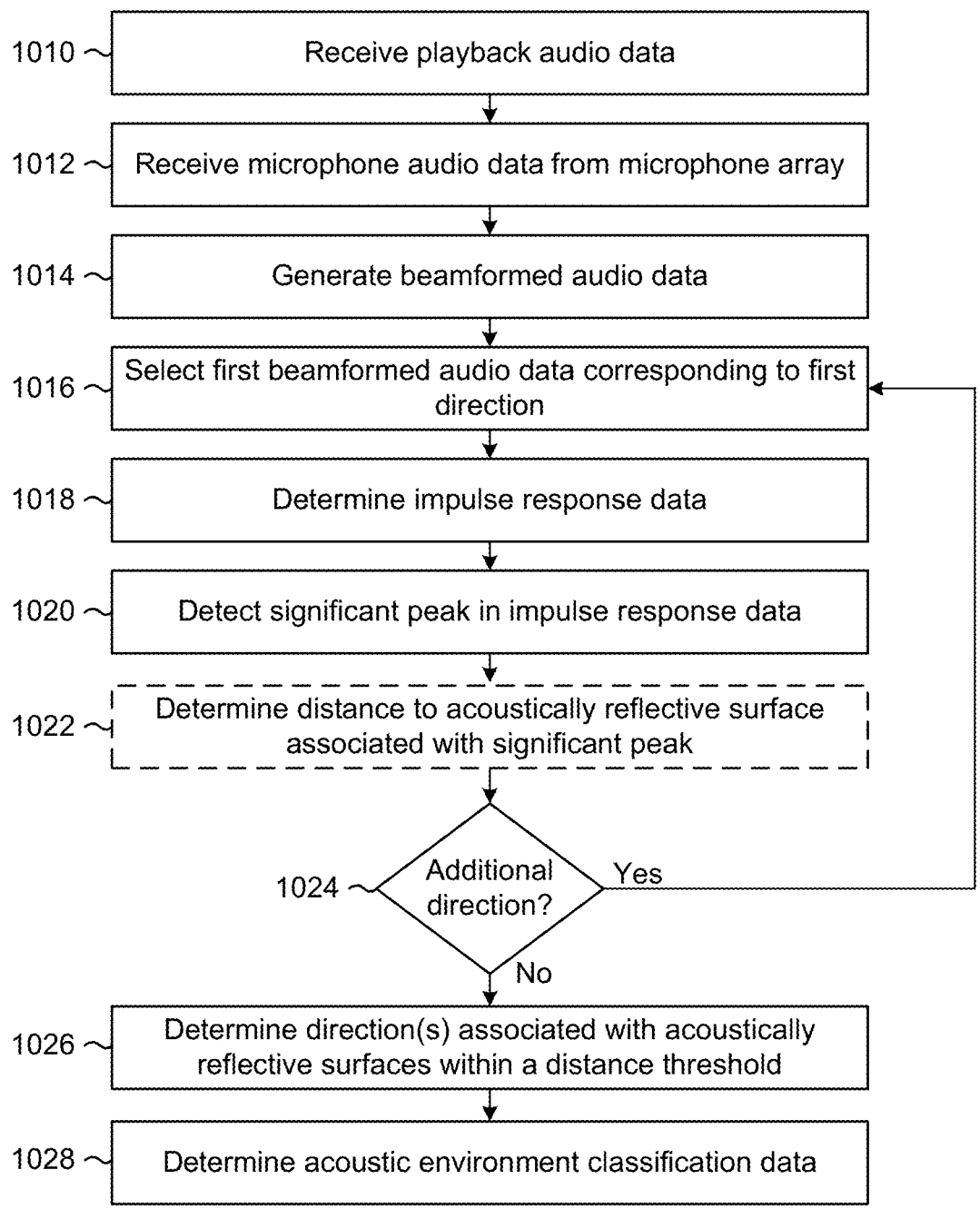
FIG. 10 is a flowchart conceptually illustrating an example method for determining distances and elevations associated with acoustically reflective surfaces according to embodiments of the present disclosure.

FIG. 10 is a flowchart conceptually illustrating an example method for determining distances and elevations associated with acoustically reflective surfaces according to embodiments of the present disclosure. As illustrated in FIG. 10, the device 110 may receive (1010) playback audio data associated with audible sound(s) output by the loudspeaker(s) 114, may receive (1012) microphone audio data from the microphone array, and may generate (1014) beamformed audio data corresponding to a plurality of directions using the microphone audio data. The device 110 may select (1016) first beamformed audio data corresponding to a first direction and determine (1018) impulse response data corresponding to the first direction based on the playback audio data and the first beamformed audio data.

Based on the impulse response data, the device 110 may determine a distance and/or elevation associated with an acoustically reflective surface (e.g., wall, ceiling, large object, or the like). For example, each peak (e.g., non-zero element) in the impulse response data indicates a reflection and may correspond to an acoustically reflective surface. The device 110 may detect (1020) an earliest significant peak in the impulse response data and may optionally determine (1022) a first distance based on a first time delay associated with the first peak. For example, the first peak may correspond to reflected sound waves (e.g., early reflection) reflected by the acoustically reflective surface and the device 110 may determine the first time delay based on the earliest significant peak.

The device 110 may determine (1024) if there is an additional direction associated with beamformed audio data and, if so, may loop to step 1016 to repeat steps 1016-1024 for the additional beamformed audio data. If there is not an additional direction not associated with the beamformed audio data, the device 110 may determine (1026) direction(s) associated with acoustically reflective surfaces within a distance threshold (e.g., having a time delay less than a time threshold), and may determine (1028) the acoustic environment classification data.

By determining the impulse response, distance(s), elevation(s), and/or direction(s) associated with the acoustically reflective surface(s), the device 110 may improve a performance of the device 110 in several different applications. For example, the device 110 may improve fixed-beamformer selection, environment-adaptive beamforming, device arbitration, and/or adaptive echo cancellation, although the disclosure is not limited thereto.

When look directions and beam coefficients of a beamformer are fixed, the device 110 needs to make a decision as to which beam to select for speech recognition. Generally, the goal is to select the beam which points in the direction of a user speaking (e.g., speech direction). A typical approach is to estimate the per-beam signal-to-noise ratio (SNR) and pick the beam with the highest signal-to-noise ratio. While this approach is simple, it does not take into account walls in the vicinity of the device 110, which result in reflections. For example, when the device 110 is placed in the vicinity of an acoustically reflective surface (e.g., wall), the SNR is no longer a good proxy to estimate a speech direction since reflections from the wall have approximately the same power as the direction sound. Depending on the angle of incidence and the beam look directions, the signal power of a beam pointing towards the wall may be larger than that of the beam pointing in the speech direction.

However, knowing distance(s)/elevation(s)/direction(s) of the acoustically reflective surfaces around the device 110, along with a relative location of the acoustically reflective surfaces and/or the device 110, enables the device 110 to disqualify look directions pointing towards the walls and focus beams onto the relevant half-plane (or quarter-plane when the device 110 is positioned in a corner). In some examples, the device 110 may disqualify (e.g., ignore) beams pointing towards a wall, reducing a number of beams from which to select. Additionally or alternatively, the device 110 may redirect the beams to ignore look directions pointing towards the wall, increasing an angular resolution of the beamformer (e.g., each beam is associated with a smaller angle and is therefore more focused).

In conjunction with this information, by tracking which lobe of a beampattern the device 110 most often selects as having the strongest spoken signal path over time, the device 110 may begin to notice patterns in which lobes are selected. If a certain set of lobes (or microphones) is selected, the device can heuristically determine the user's typical speaking location in the environment. The device may devote more CPU resources to digital signal processing (DSP) techniques for that lobe or set of lobes. For example, the device 110 may run acoustic echo cancelation (AEC) at full strength across the three most commonly targeted lobes, instead of picking a single lobe to run AEC at full strength. The techniques may thus improve subsequent automatic speech recognition (ASR) and/or speaker recognition results as long as the device is not rotated or moved. And, if the device 110 is moved, the techniques may help the device to determine this change by comparing current RIR results to historical ones to recognize differences that are significant enough to cause the device to begin processing the signal coming from all lobes approximately equally, rather than focusing only on the most commonly targeted lobes.

Criterion and algorithms that generate filter coefficients for specific look directions are generally derived under free-space assumptions, both as they pertain to signal propagation and the noise model (e.g., MVDR and LCMV criterions). Therefore, the device 110 may improve environment-adaptive beamforming as knowledge of the geometry around the device (e.g., acoustically reflective surfaces in proximity to the device 110 and/or a general layout of the room) can be leveraged to move beyond the simplifying free-space assumption and improve beam shapes.

Typically, device arbitration is performed based on an estimated signal-to-noise ratio. However, the device 110 may improve device arbitration as knowledge of the environment around the device can be a feature for device arbitration. For example, if a first device is in a corner of a room and a second device is away from acoustically reflective surfaces, device arbitration may take into account the environment (e.g., relative locations of the acoustically reflective surfaces) and select the second device.

Typically, an acoustic echo cancellation (AEC) component or adaptive noise cancellation (ANC) component is fed reference audio data and microphone audio data and estimates an aggregate impulse response, which consists of a system impulse response and a room impulse response. However, the device 110 may improve adaptive noise cancellation using a sparse, informed echo canceller. For example, the system impulse response is approximately known a priori, so the device 110 may estimate the room impulse response using a sparse adaptive filter.

Figure 11:
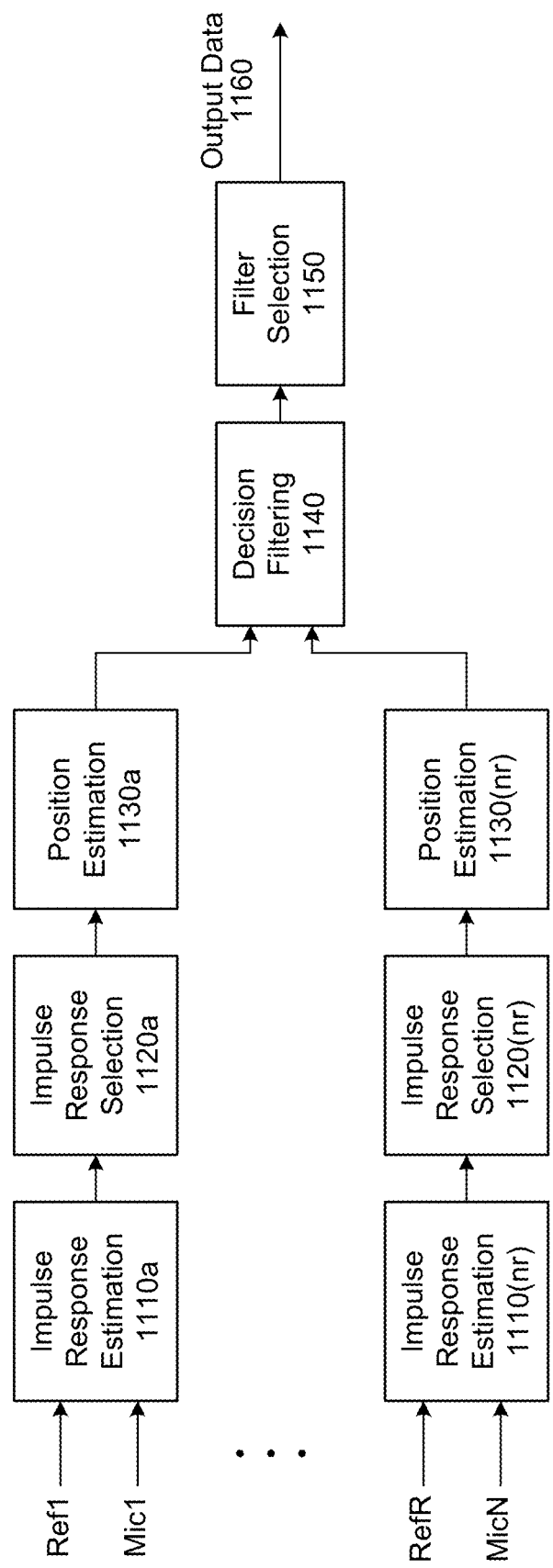
FIG. 11 illustrates an example component diagram according to embodiments of the present disclosure.

FIG. 11 illustrates an example component diagram according to embodiments of the present disclosure. As illustrated in FIG. 11, the device 110 may process each microphone signal and reference signal independently, resulting in a plurality of microphone/reference combinations. For example, a first impulse response estimation component 1110*a* may receive first reference audio data (e.g., Ref1) and first microphone audio data (e.g., Mic1), a second impulse response estimation component 1110*b* may receive the first reference audio data (e.g., Ref1) and second microphone audio data (e.g., Mic1), a third impulse response estimation component 1110*c* may receive second reference audio data (e.g., Ref2) and the first microphone audio data (e.g., Mic1), and so on until a final impulse response estimation component 1110(*nr*) may receive a final reference audio data (e.g., RefR) and final microphone audio data (e.g., MicN). Thus, the device 110 may include a number of impulse response estimation components 1110 based on a first number (e.g., N) of microphone signals and a second number (e.g., R) of reference signals to process.

The first impulse response estimation component 1110*a* may receive the first reference audio data and the first microphone audio data and may generate estimated impulse response data corresponding to an impulse response between a first loudspeaker 114 and the first microphone. The first impulse response estimation component 1110*a* may output the estimated impulse response data to a first impulse response selection component 1120*a*, which may select a portion of the estimated impulse response data for further processing. For example, the first impulse response selection component 1120*a* may select only a first portion (e.g., 100 samples) of the estimated impulse response data that represents the direct path component and early reflections within a certain distance.

The first impulse response selection component 1120*a* may output the selected impulse response data to a first position estimation component 1130*a*. The first position estimation component 1130*a* may correspond to a trained model (e.g., machine learning) that is configured to estimate a position of the device 110 relative to acoustically reflective surfaces. The first position estimation component 1130*a* may output specific position data that indicates a precise position of the device 110 relative to the acoustically reflective surfaces (e.g., 10 cm from first wall, 40 cm from second wall, etc.). However, the disclosure is not limited thereto, and in other examples the first position estimation component 1130*a* may output acoustic environment classification data that does not indicate a precise position but simply a category of positions (e.g., corner position, wall position, free position, etc.) without departing from the disclosure. Thus, the first position estimation component 1130*a* may output first data indicating a position of the device 110, which may correspond to specific position data and/or acoustic environment classification data.

The first position estimation component 1130*a* may output the first data to a decision filtering component 1140. The decision filtering component 1140 may receive position data from each of the position estimation components 1130 and may finalize a decision regarding the position of the device 110 based on results received from multiple microphone/reference combinations. Thus, while individual position estimation components 1130 may determine that the device 110 is in different positions, the decision filtering component 1140 may determine a most likely position based on the position data received from a plurality of the position estimation components 1130.

In some examples, the decision filtering component 1140 may select the acoustic environment classification data that is supported by the most microphone/reference pair combinations (e.g., the most position estimation components 1130). For example, if 7 combinations correspond to first acoustic environment classification data (e.g., corner position) and 3 combinations correspond to second acoustic environment classification data (e.g., wall position), the decision filtering component 1140 may select the first acoustic environment classification data. However, the disclosure is not limited thereto, and the decision filtering component 1140 may determine the final acoustic environment classification based on a portion of the microphone/reference pair combinations (e.g., combining separate position data from multiple combinations to generate an average position or the like), by processing the acoustic environment classification data using a trained model (e.g., machine learning model), and/or by using any technique known to one of skill in the art without departing from the disclosure. For example, the decision filtering component 1140 may only update the final acoustic environment classification data if the acoustic environment classifications determined using each of the microphones is the same, using a previous acoustic environment classification if the microphone signals result in two or more different acoustic environment classifications.

Additionally or alternatively, the device 110 may determine an individual confidence score value associated with acoustic environment classification data for each microphone/reference pair combination, wherein the confidence score value indicates a likelihood that the acoustic environment classification data is accurate. Using the confidence score values, the decision filtering component 1140 may determine the final acoustic environment classification data. For example, the decision filtering component 1140 may generate a weighted estimate of the confidence score for each acoustic environment classification and may select the highest confidence score. However, the disclosure is not limited thereto and the decision filtering component 1140 may select a particular acoustic environment classification that is associated with highest confidence score values without generating a combined confidence score or weighted estimate. In some examples, the decision filtering component 1140 may only select an acoustic environment classification if the confidence score value exceeds a threshold (e.g., 75%). For example, if the corner position is associated with a confidence level of 90% (e.g., 0.9), the decision filtering component 1140 may select the corner position as the final acoustic environment classification. However, if none of the confidence levels exceed the threshold value (e.g., 75%), the decision filtering component 1140 may use a previously selected acoustic environment classification. Thus, the decision filtering component 1140 may determine the final acoustic environment classification based on history information (e.g., previously selected acoustic environment classifications) without departing from the disclosure.

The decision filtering component 1140 may output the final position data to a filter selection component 1150 and the filter selection component 1150 may select a predefined filter as output data 1160. For example, the filter selection component 1150 may store or have access to a plurality of predefined filters corresponding to a variety of positions and may select a single predefined filter based on the final position data.

In some examples, the device 110 may only use the impulse response data generated by the AEC component when the AEC component is operating in a good condition or state. For example, the device 110 may use signal quality metric values to determine whether the AEC component is operating in a good condition or not. To illustrate an example, the device 110 may determine an echo return loss enhancement (ERLE) value associated with the AEC component, which is defined as:

$$ERLE = 10\log\left(\frac{E|y^2(n)|}{E|(y(n)-\hat{y}(n))^2|}\right) \quad [7]$$

where y(n) and ŷ(n) represent the true echo signal and the estimated echo signal, and E represents the expected value. The ERLE value measures how much of the echo signal contained in the microphone signal is reduced.

Figure 12:
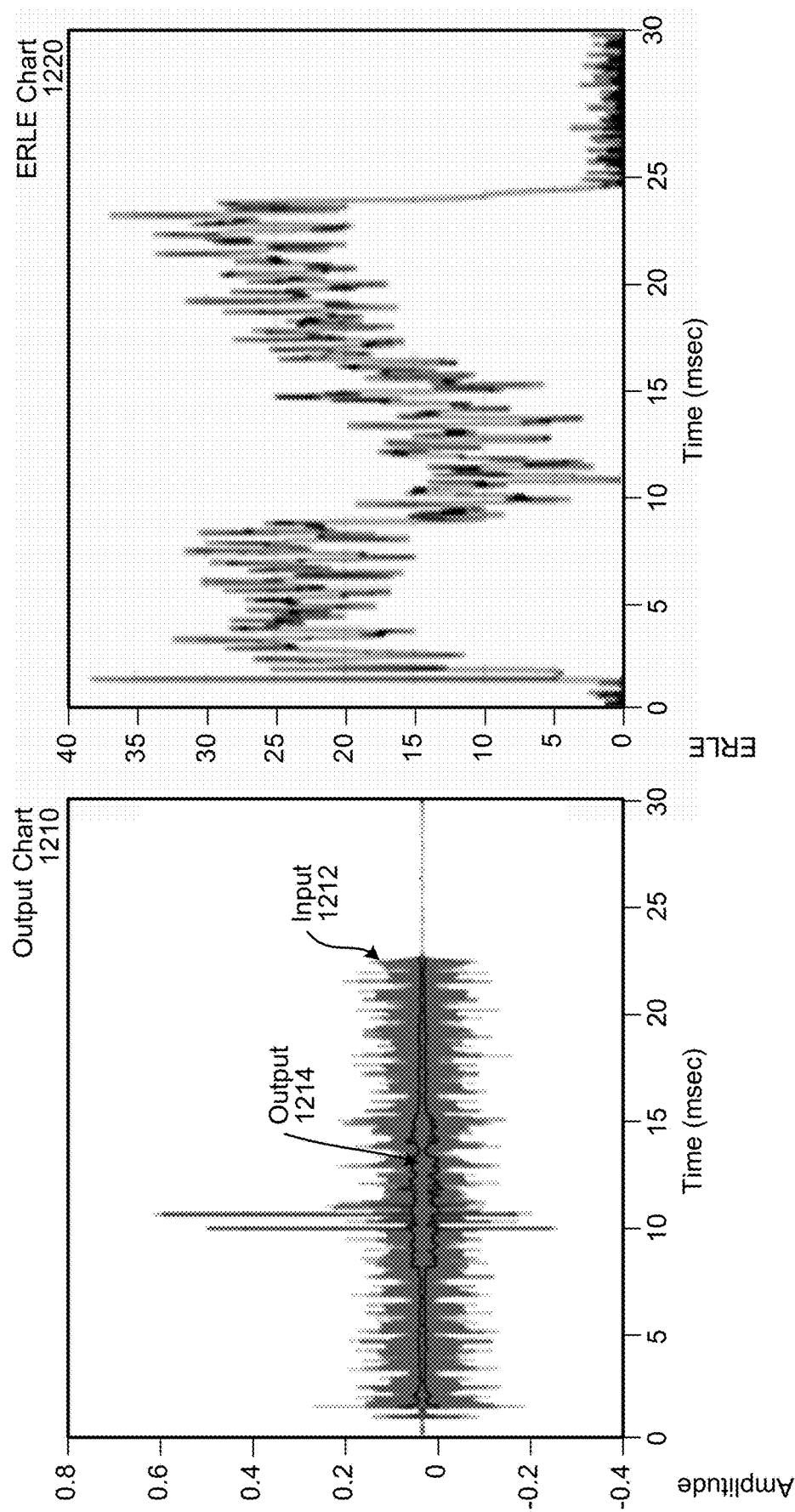
FIG. 12 illustrates an example of an output signal and corresponding ERLE values according to embodiments of the present disclosure.

FIG. 12 illustrates an example of an output signal and corresponding ERLE values according to embodiments of the present disclosure. FIG. 12 illustrates an output chart 1210, which represents an input signal 1212 and an output signal 1214 generated by an AEC component over time, along with an ERLE chart 1220 that represents ERLE values over time. As illustrated in the output chart 1210, the AEC component converges after a brief delay at the beginning and then cancels most echo and other noise.

The ERLE values fluctuate with time, achieving higher values when there is no competing noise in the environment, such as people talking or other environment noise (e.g., television sounds, mechanical sounds, etc.). When noise is present, however, the ERLR values drop. For example, the output signal 1214 fluctuates between 8 ms and 15 ms, resulting in ERLE values that are noticeably lower (e.g., below 20) during this time. When the playback signal is silence (e.g., input signal 1212 is close to a value of 0 between 23 ms and 30 ms), the ERLE values drop to near zero as well. Thus, the ERLE is a good indicator for checking a quality of the impulse response estimated from the AEC component.

Figure 13:
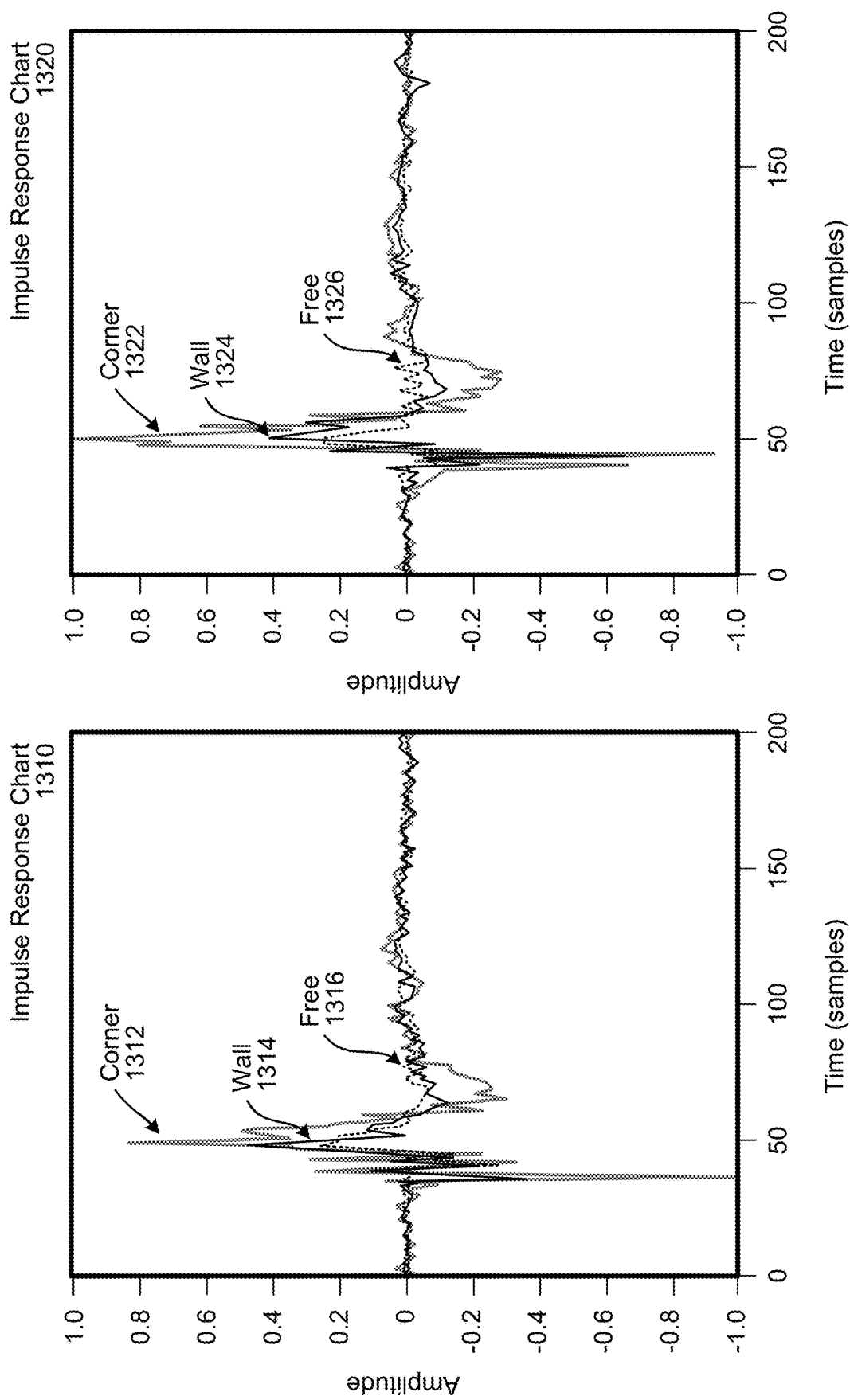
FIG. 13 illustrates examples of different impulse responses depending on a position of the device relative to acoustically reflective surfaces according to embodiments of the present disclosure.

FIG. 13 illustrates examples of different impulse responses depending on a position of the device relative to acoustically reflective surfaces according to embodiments of the present disclosure. FIG. 13 illustrates a first impulse response chart 1310, which corresponds to a first reference signal (e.g., left stereo channel), and a second impulse response chart 1320, which corresponds to a second reference signal (e.g., right stereo channel). As illustrated in FIG. 13, the first impulse response chart 1310 represents a first impulse response 1312 (e.g., solid gray line) corresponding to a corner position (e.g., in proximity to a wall or acoustically reflective surface in two or more directions), a second impulse response 1314 (e.g., solid black line) corresponding to a wall position (e.g., in proximity to a wall or acoustically reflective surface in a single direction), and a third impulse response 1316 (e.g., dotted black line) corresponding to a free position (e.g., away from any wall or acoustically reflective surface).

As illustrated in FIG. 13, the second impulse response chart 1320 represents a fourth impulse response 1322 (e.g., solid gray line) corresponding to a corner position (e.g., in proximity to a wall or acoustically reflective surface in two or more directions), a fifth impulse response 1324 (e.g., solid black line) corresponding to a wall position (e.g., in proximity to a wall or acoustically reflective surface in a single direction), and a sixth impulse response 1326 (e.g., dotted black line) corresponding to a free position (e.g., away from any wall or acoustically reflective surface).

As represented in the first impulse response chart 1310 and the second impulse response chart 1320, the device 110 may distinguish between different positions based on the impulse response data. While FIG. 13 illustrates two impulse response charts, which corresponds to a single microphone and two reference signals, this is intended for illustrative purposes only and the disclosure is not limited thereto. Instead, the number of microphone(s) and/or reference signal(s) may vary and the device 110 may determine unique impulse response data for any combination of the microphone(s) and/or the reference signal(s) without departing from the disclosure.

Figure 14:
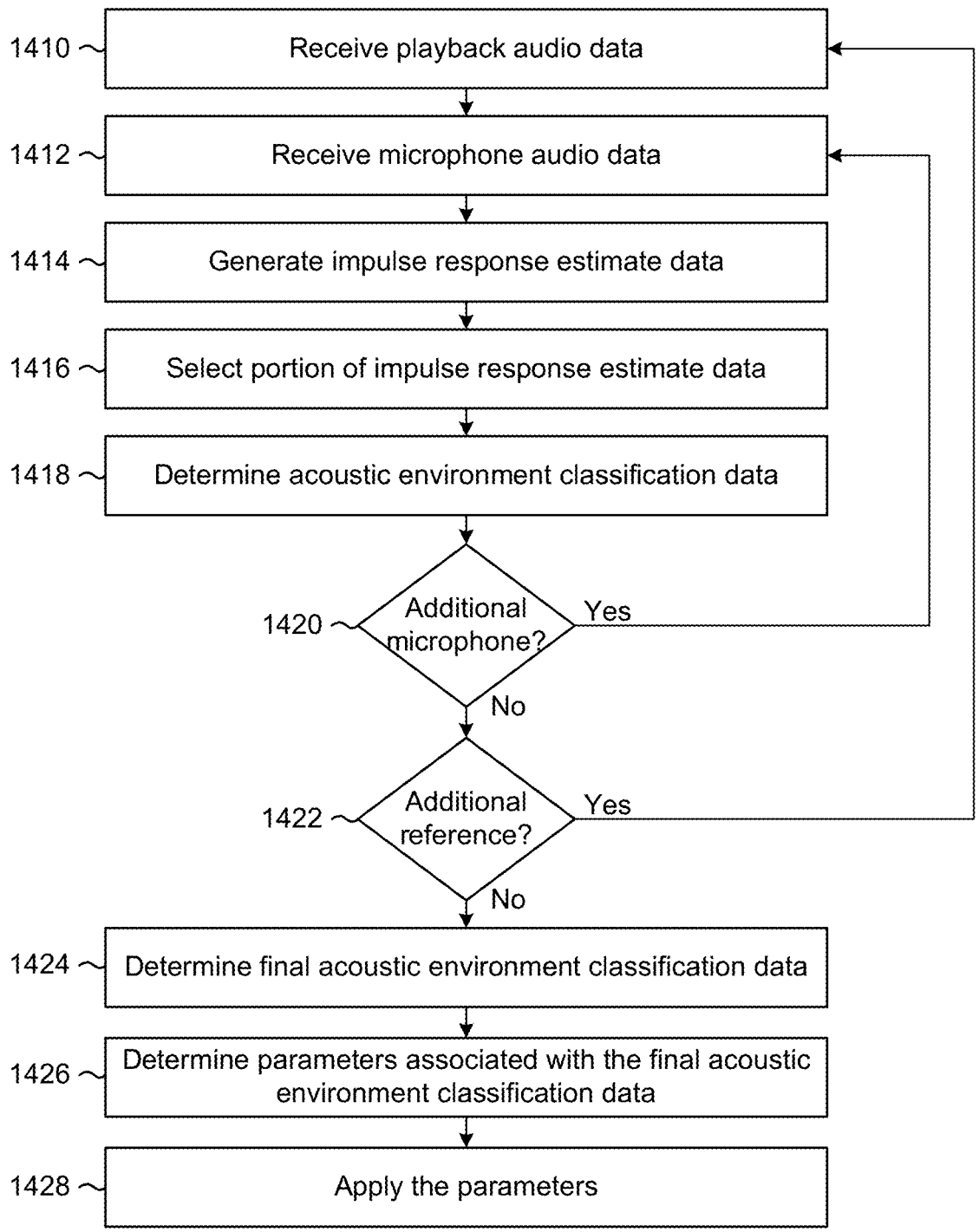
FIG. 14 is a flowchart conceptually illustrating an example method for determining acoustic environment classification data using a combination of multiple microphone signals and multiple reference signals according to embodiments of the present disclosure.

FIG. 14 is a flowchart conceptually illustrating an example method for determining acoustic environment classification data using a combination of multiple microphone signals and multiple reference signals according to embodiments of the present disclosure. As illustrated in FIG. 14, the device 110 may receive (1410) playback audio data (e.g., reference audio data) corresponding to a loudspeaker, may receive (1412) microphone audio data corresponding to a microphone, and may generate (1414) impulse response estimate data. For example, the AEC component may apply a plurality of filter coefficients to the playback audio data to generate estimated echo data and may perform acoustic echo cancellation by subtracting the estimated echo data from the microphone audio data to generate isolated audio data. While performing AEC, the AEC component may adapt or update the plurality of filter coefficients, and the device 110 may use the plurality of filter coefficients to generate the impulse response estimate data.

The device 110 may select (1416) a portion of the impulse response estimate data, such as a beginning of the impulse response estimate data corresponding to a direct path component and early reflections, and may determine (1418) acoustic environment classification data using the selected impulse response estimate data. As described in greater detail above, in some examples the device 110 may determine the acoustic environment classification data based on precise position data, which indicates a specific distance and/or direction to one or more acoustically reflective surfaces. However, the disclosure is not limited thereto and in other examples the device 110 may determine the acoustic environment classification data by determining a number of acoustically reflective surfaces in proximity to the device 110, without any regard to distance and/or direction of the acoustically reflective surfaces.

The device 110 may determine (1420) whether there is an additional microphone signal and, if so, may loop to step 1412 and repeat steps 1412-1418 for the additional microphone signal. If there are no additional microphone signals, the device 110 may determine (1422) whether there is an additional reference signal and, if so, may loop to step 1410 and repeat steps 1410-1420 for the additional reference signal. If there are no additional reference signals, the device 110 may determine (1424) final acoustic environment classification data based on the acoustic environment classification data determined for each combination of microphone signal and reference signal (e.g., microphone/reference pair combinations).

In some examples, the device 110 may select the acoustic environment classification data that is supported by the most microphone/reference pair combinations. For example, if 7 combinations correspond to first acoustic environment classification data (e.g., corner position) and 3 combinations correspond to second acoustic environment classification data (e.g., wall position), the device 110 may select the first acoustic environment classification data. However, the disclosure is not limited thereto, and the device 110 may determine the final acoustic environment classification based on a portion of the microphone/reference pair combinations (e.g., combining separate position data from multiple combinations to generate an average position or the like), by processing the acoustic environment classification data using a trained model (e.g., machine learning model), and/or by using any technique known to one of skill in the art without departing from the disclosure. For example, the device 110 may only update the final acoustic environment classification data if the acoustic environment classifications determined using each of the microphones is the same, using a previous acoustic environment classification if the microphone signals result in two or more different acoustic environment classifications.

Additionally or alternatively, the device 110 may determine an individual confidence score value associated with acoustic environment classification data for each microphone/reference pair combination, wherein the confidence score value indicates a likelihood that the acoustic environment classification data is accurate. Using the confidence score values, the device 110 may determine the final acoustic environment classification data. For example, the device 110 may generate a weighted estimate of the confidence score for each acoustic environment classification and may select the highest confidence score. However, the disclosure is not limited thereto and the device 110 may select a particular acoustic environment classification that is associated with highest confidence score values without generating a combined confidence score or weighted estimate. In some examples, the device 110 may only select an acoustic environment classification if the confidence score value exceeds a threshold (e.g., 75%). For example, if the corner position is associated with a confidence level of 90% (e.g., 0.9), the device 110 may select the corner position as the final acoustic environment classification. However, if none of the confidence levels exceed the threshold value (e.g., 75%), the device 110 may use a previously selected acoustic environment classification. Thus, the device 110 may determine the final acoustic environment classification based on history information (e.g., previously selected acoustic environment classifications) without departing from the disclosure.

The device 110 may determine (1426) parameters associated with the final acoustic environment classification data and may apply (1428) the parameters. For example, the parameters may correspond to equalization settings and the device 110 may apply the equalization settings prior to sending output audio data to the loudspeaker(s) 114 to generate output audio. The parameters may be predetermined and stored in a database, such that the device 110 determines the parameters by selecting one set of parameters from a plurality of parameters stored in the database based on the final acoustic environment classification data.

Figure 15:
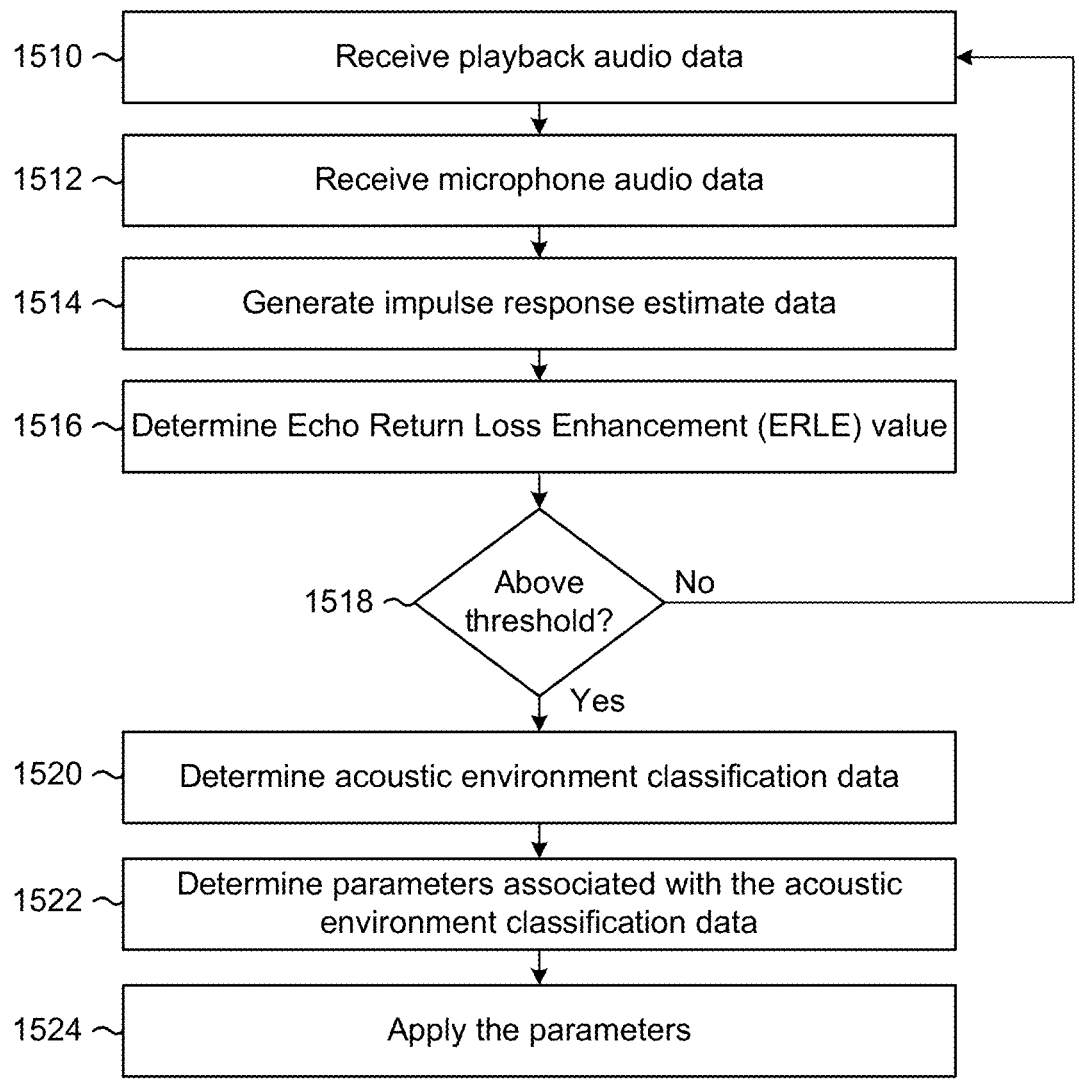
FIG. 15 is a flowchart conceptually illustrating an example method for determining acoustic environment classification data depending on ERLE values according to embodiments of the present disclosure.

FIG. 15 is a flowchart conceptually illustrating an example method for determining acoustic environment classification data depending on ERLE values according to embodiments of the present disclosure. As illustrated in FIG. 15, the device 110 may receive (1510) playback audio data (e.g., reference audio data), may receive (1512) microphone audio data, and may generate (1514) impulse response estimate data. For example, the AEC component may apply a plurality of filter coefficients to the playback audio data to generate estimated echo data and may perform acoustic echo cancellation by subtracting the estimated echo data from the microphone audio data to generate isolated audio data. While performing AEC, the AEC component may adapt or update the plurality of filter coefficients, and the device 110 may use the plurality of filter coefficients to generate the impulse response estimate data.

The device 110 may determine (1516) an echo return loss enhancement (ERLE) value associated with the AEC component and may determine (1518) whether the ERLE value is above a threshold value (e.g., satisfies a condition). If the ERLE value is not above the threshold value, the device 110 may loop to step 1510 and may repeat steps 1510-1516 until the ERLE value is above the threshold value.

If the ERLE value is above the threshold value, the device 110 may determine (1520) acoustic environment classification data, may determine (1522) parameters associated with the acoustic environment classification data, and may apply (1524) the parameters, as discussed above with regard to FIG. 14. Thus, the device 110 may only use the impulse response estimate data to generate the acoustic environment classification data when the AEC is operating in a good condition, as indicated by the ERLE value.

While FIG. 15 illustrates the device 110 measuring the ERLE value, the disclosure is not limited thereto and the device 110 may use any signal quality metric known to one of skill in the art without departing from the disclosure. Additionally or alternatively, while FIG. 15 illustrates the device 110 determining that the ERLE value is above a threshold value, the disclosure is not limited thereto and the device 110 may determine that the ERLE value (e.g., signal quality metric value) satisfies a condition using any technique known to one of skill in the art without departing from the disclosure. For example, the device 110 may determine that the ERLE value is below the threshold value, may determine that the ERLE value is within a range of acceptable values, and/or the like without departing from the disclosure.

For ease of illustration, FIG. 15 illustrates that the device 110 determines the ERLE value and acoustic environment classification data a single time. However, the disclosure is not limited thereto, and the steps illustrated in FIG. 14 and FIG. 15 may be combined to determine the ERLE value for individual microphone/reference combinations prior to determining the final acoustic environment classification data without departing from the disclosure. Additionally or alternatively, the device 110 may determine a global ERLE value for the AEC component and only use the final acoustic environment classification data if the global ERLE value satisfies the condition without departing from the disclosure.

Figure 16:
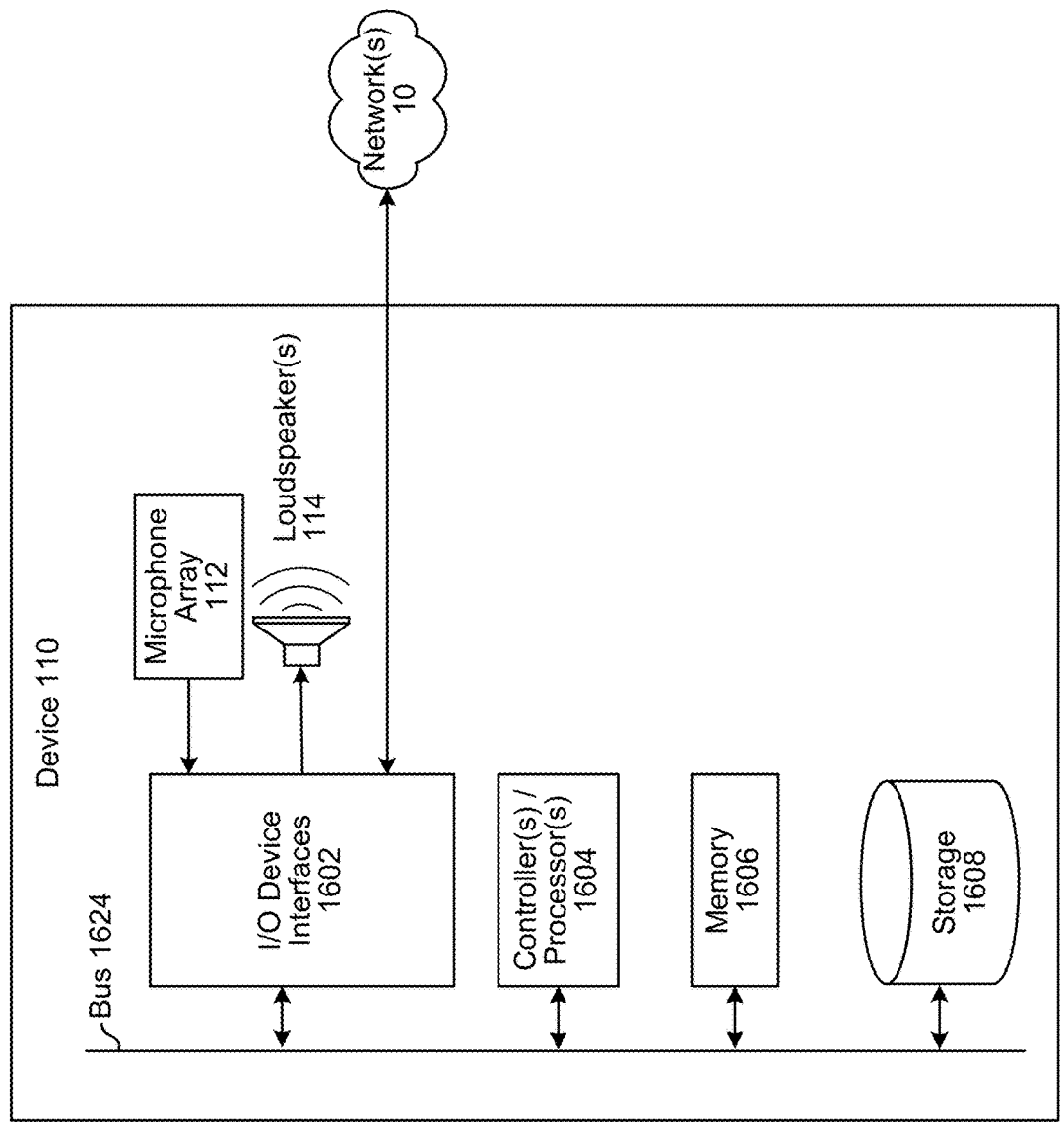
FIG. 16 is a block diagram conceptually illustrating example components of a system for determining a distance and/or direction of an acoustically reflective surface according to embodiments of the present disclosure.

FIG. 16 is a block diagram conceptually illustrating example components of the system 100. In operation, the system 100 may include computer-readable and computer-executable instructions that reside on the device 110, as will be discussed further below.

The system 100 may include one or more audio capture device(s), such as a microphone 112 or an array of microphones 112. The audio capture device(s) may be integrated into the device 110 or may be separate. The system 100 may also include an audio output device for producing sound, such as loudspeaker(s) 114. The audio output device may be integrated into the device 110 or may be separate.

The device 110 may include an address/data bus 1624 for conveying data among components of the device 110. Each component within the device 110 may also be directly connected to other components in addition to (or instead of) being connected to other components across the bus 1624.

The device 110 may include one or more controllers/processors 1604, which may each include a central processing unit (CPU) for processing data and computer-readable instructions, and a memory 1606 for storing data and instructions. The memory 1606 may include volatile random access memory (RAM), non-volatile read only memory (ROM), non-volatile magnetoresistive (MRAM) and/or other types of memory. The device 110 may also include a data storage component 1608, for storing data and controller/processor-executable instructions. The data storage component 1608 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1602.

Computer instructions for operating the device 110 and its various components may be executed by the controller(s)/processor(s) 1604, using the memory 1606 as temporary "working" storage at runtime. The computer instructions may be stored in a non-transitory manner in non-volatile memory 1606, storage 1608, or an external device. Alternatively, some or all of the executable instructions may be embedded in hardware or firmware in addition to or instead of software.

The device 110 includes input/output device interfaces 1602. A variety of components may be connected through the input/output device interfaces 1602, such as the microphone array 112, the loudspeaker(s) 114, and a media source such as a digital media player (not illustrated). The input/output interfaces 1602 may include A/D converters for converting the output of microphone 112 into microphone audio data, if the microphones 112 are integrated with or hardwired directly to device 110. If the microphones 112 are independent, the A/D converters will be included with the microphones, and may be clocked independent of the clocking of the device 110. Likewise, the input/output interfaces 1602 may include D/A converters for converting playback audio data into an analog current to drive the loudspeakers 114, if the loudspeakers 114 are integrated with or hardwired to the device 110. However, if the loudspeakers are independent, the D/A converters will be included with the loudspeakers, and may be clocked independent of the clocking of the device 110 (e.g., conventional Bluetooth loudspeakers).

The input/output device interfaces 1602 may also include an interface for an external peripheral device connection such as universal serial bus (USB), FireWire, Thunderbolt or other connection protocol. The input/output device interfaces 1602 may also include a connection to one or more networks 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   sending, by a device located in a room, first audio data to a loudspeaker to be output as audible sound;
   receiving, from a first microphone of the device, second audio data including a first representation of speech and a first representation of the audible sound;
   processing the first audio data and a plurality of adaptive filter coefficient values using an acoustic echo canceller (AEC) component to generate third audio data including a second representation of the audible sound;
   subtracting the third audio data from the second audio data to generate fourth audio data, the fourth audio data including a second representation of the speech;
   determining, by the AEC component, first impulse response data corresponding to the plurality of adaptive filter coefficient values, the first impulse response data representing first acoustic characteristics corresponding to the first microphone;
   determining a first echo return loss enhancement (ERLE) value corresponding to a first portion of the fourth audio data;
   determining that the first ERLE value is above a threshold value, the threshold value indicating that the AEC component is operating in a normal state;
   processing the first impulse response data using a deep neural network (DNN) to determine that the device is located in a corner of the room;
   in response to determining that the device is in the corner, determining a plurality of equalization filter coefficient values associated with an equalization filter of the device;
   using the equalization filter and the plurality of equalization filter coefficient values to generate output audio data; and
   sending the output audio data to the loudspeaker to generate output audio.

2. The computer-implemented method of claim 1, further comprising:
   applying the plurality of equalization filter coefficient values to a first portion of the output audio data;
   determining, by the AEC component, second impulse response data associated with a second portion of the fourth audio data;
   determining a second ERLE value corresponding to the second portion of the fourth audio data;

determining that the second ERLE value is lower than the threshold value, indicating that the AEC component is not operating in the normal state; and applying the plurality of equalization filter coefficient values to a second portion of the output audio data.

3. The computer-implemented method of claim 1, further comprising:

receiving, from a second microphone of the device, fifth audio data;

subtracting the third audio data from the fifth audio data to generate sixth audio data, the sixth audio data including a third representation of the speech;

determining, by the AEC component, second impulse response data representing second acoustic characteristics corresponding to the second microphone;

determining a second ERLE value corresponding to a first portion of the sixth audio data;

determining that the second ERLE value is above the threshold value; and processing the second impulse response data using the DNN to determine that the device is in the corner of the room.

4. A computer-implemented method comprising:

sending, by a device located in an environment, first audio data to at least one loudspeaker;

receiving second audio data associated with a first microphone, the second audio data including a first representation of audible sound output by the at least one loudspeaker, the audible sound corresponding to the first audio data;

processing the first audio data and the second audio data using an echo canceller to generate third audio data;

determining, by the echo canceller, first impulse response data representing first acoustic characteristic corresponding to the first microphone;

determining a first signal quality metric value corresponding to a first portion of the third audio data;

determining that the first signal quality metric value satisfies a condition;

processing the first impulse response data to generate first data indicating a first position of the device relative to one or more acoustically reflective surfaces in the environment; and determining, based on the first data, a first parameter associated with an audio processing component of the device.

5. The computer-implemented method of claim 4, wherein processing the first audio data and the second audio data further comprises:

processing the first audio data and a plurality of filter coefficient values using the echo canceller to generate fourth audio data, the fourth audio data including a second representation of the audible sound; and subtracting the fourth audio data from the second audio data to generate the third audio data.

6. The computer-implemented method of claim 4, further comprising:

in response to determining that the first signal quality metric value satisfies the condition, applying the first parameter to a first portion of fourth audio data to generate a first portion of the first audio data;

determining, by the echo canceller, second impulse response data associated with a second portion of the third audio data;

determining a second signal quality metric value corresponding to the second portion of the third audio data;

determining that the second signal quality metric value does not satisfy the condition; and in response to determining that the second signal quality metric value does not satisfy the condition, applying the first parameter to a second portion of the fourth audio data to generate a second portion of the first audio data.

7. The computer-implemented method of claim 4, further comprising:

receiving fourth audio data associated with a second microphone;

processing the first audio data and the fourth audio data using the echo canceller to generate fifth audio data;

determining, by the echo canceller, second impulse response data representing second acoustic characteristic corresponding to the second microphone;

determining a second signal quality metric value corresponding to a first portion of the fifth audio data;

determining that the second signal quality metric value satisfies the condition;

processing the second impulse response data to generate second data indicating a second position of the device relative to the one or more acoustically reflective surfaces; and determining, based on the first data and the second data, the first parameter.

8. The computer-implemented method of claim 4, wherein determining the first data further comprises:

processing the first impulse response data to determine the first data, wherein the first data indicates that the device is positioned in proximity to a first acoustically reflective surface in a first direction relative to the device and a second acoustically reflective surface in a second direction relative to the device.

9. The computer-implemented method of claim 4, wherein determining the first data further comprises:

processing the first impulse response data to determine the first data, wherein the first data indicates that the device is positioned in proximity to a single acoustically reflective surface.

10. The computer-implemented method of claim 4, wherein determining the first data further comprises:

processing the first impulse response data to determine the first data, wherein the first data indicates that the device is positioned away from the one or more acoustically reflective surfaces.

11. The computer-implemented method of claim 4, further comprising:

receiving, prior to sending the first audio data, second data including:
the first parameter that is associated with the audio processing component and corresponds to the first position of the device relative to the one or more acoustically reflective surfaces, and
a second parameter that is associated with the audio processing component and corresponds to a second position of the device relative to the one or more acoustically reflective surfaces, wherein determining the first parameter further comprises:
determining that the first data indicates the first position, and
selecting the first parameter.

12. The computer-implemented method of claim 4, wherein sending the first audio data further comprises:

receiving fourth audio data;

processing the first parameter and the fourth audio data using the audio processing component to generate the first audio data; and sending the first audio data to the at least one loudspeaker, wherein the at least one loudspeaker generates the audible sound corresponding to the first audio data.

13. A computer-implemented method comprising:
sending, by a device located in an environment, first audio data to at least one loudspeaker;
receiving second audio data associated with a first microphone, the second audio data including a first representation of audible sound output by the at least one loudspeaker, the audible sound corresponding to the first audio data;
receiving third audio data associated with a second microphone, the third audio data including a second representation of the audible sound;
determining, using the first audio data and the second audio data, first impulse response data representing first acoustic characteristics corresponding to the first microphone;
processing, using a first model, the first impulse response data to generate first data indicating a first position of the device relative to one or more acoustically reflective surfaces in the environment;
determining, using the first audio data and the third audio data, second impulse response data representing second acoustic characteristics corresponding to the second microphone;
processing, using a second model, the second impulse response data to generate second data indicating a second position of the device relative to the one or more acoustically reflective surfaces in the environment;
determining, using the first data and the second data, third data indicating the first position of the device relative to the one or more acoustically reflective surfaces; and
determining, based on the third data, a first parameter associated with an audio processing component of the device.

14. The computer-implemented method of claim 13, wherein determining the first impulse response data further comprises:
processing the first audio data and a plurality of filter coefficient values using an echo canceller to generate fourth audio data, the fourth audio data including a third representation of the audible sound;
subtracting the fourth audio data from the second audio data to generate fifth audio data; and
determining the first impulse response data using the plurality of filter coefficient values.

15. The computer-implemented method of claim 13, wherein determining the first impulse response data further comprises:
processing the first audio data and the second audio data using an echo canceller to generate fourth audio data;
determining, by the echo canceller, the first impulse response data, the first impulse response data associated with the first microphone and a first portion of the fourth audio data;

determining a first signal quality metric value corresponding to the first portion of the fourth audio data;
determining that the first signal quality metric value satisfies a condition; and
in response to determining that the first signal quality metric value satisfies the condition, sending the first impulse response data to the first model.

16. The computer-implemented method of claim 15, further comprising:
determining, by the echo canceller, third impulse response data associated with the first microphone and a second portion of the fourth audio data;
determining a second signal quality metric value corresponding to the second portion of the fourth audio data;
determining that the second signal quality metric value does not satisfy the condition; and
in response to determining that the second signal quality metric value does not satisfy the condition, sending the first impulse response data to the first model.

17. The computer-implemented method of claim 13, wherein determining the first data further comprises:
processing the first impulse response data using the first model to generate the first data, wherein the first data indicates that the device is positioned in proximity to a first acoustically reflective surface in a first direction relative to the device and a second acoustically reflective surface in a second direction relative to the device.

18. The computer-implemented method of claim 13, wherein determining the first data further comprises:
processing the first impulse response data using the first model to generate the first data, wherein the first data indicates that the device is positioned in proximity to a single acoustically reflective surface.

19. The computer-implemented method of claim 13, further comprising:
receiving, prior to sending the first audio data, fourth data including:
the first parameter that is associated with the audio processing component and corresponds to the first position of the device relative to the one or more acoustically reflective surfaces, and
a second parameter associated with the audio processing component and corresponds to a second position of the device relative to the one or more acoustically reflective surfaces,
wherein determining the first parameter further comprises:
determining that the third data indicates the first position, and
selecting the first parameter.

20. The computer-implemented method of claim 13, wherein sending the first audio data further comprises:
receiving fourth audio data;
processing the first parameter and the fourth audio data using the audio processing component to generate the first audio data; and
sending the first audio data to the at least one loudspeaker, wherein the at least one loudspeaker generates the audible sound corresponding to the first audio data.

* * * * *